US011363665B2

(12) United States Patent
Youtz et al.

(10) Patent No.: US 11,363,665 B2
(45) Date of Patent: *Jun. 14, 2022

(54) NEXT GENERATION TO VOLTE FALLBACK FOR VOICE CALLS

(71) Applicant: Verizon Patent and Licensing Inc., Arlington, VA (US)

(72) Inventors: Andrew Youtz, Princeton, NJ (US); Jignesh Panchal, Hillsborough, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,415

(22) Filed: Aug. 27, 2019

(65) Prior Publication Data

US 2019/0387571 A1    Dec. 19, 2019

Related U.S. Application Data

(63) Continuation of application No. 16/003,144, filed on Jun. 8, 2018, now Pat. No. 10,455,637.

(51) Int. Cl.
| *H04W 76/27* | (2018.01) |
| *H04L 29/06* | (2006.01) |
| *H04W 76/10* | (2018.01) |
| *H04L 65/10* | (2022.01) |
| *H04W 68/02* | (2009.01) |
| *H04L 65/1016* | (2022.01) |
| *H04W 84/04* | (2009.01) |
| *H04W 88/06* | (2009.01) |

(52) U.S. Cl.
CPC ......... *H04W 76/27* (2018.02); *H04L 65/1006* (2013.01); *H04L 65/1016* (2013.01); *H04W 68/02* (2013.01); *H04W 76/10* (2018.02); *H04W 84/04* (2013.01); *H04W 88/06* (2013.01)

(58) Field of Classification Search
None
See application file for complete search history.

(56) References Cited

U.S. PATENT DOCUMENTS

| 10,111,147 | B1* | 10/2018 | Prasad | H04W 36/16 |
| 10,952,270 | B1 | 3/2021 | Sung et al. | |
| 2014/0066061 | A1 | 3/2014 | Lou et al. | |
| 2014/0293908 | A1 | 10/2014 | Kumar et al. | |
| 2015/0358477 | A1 | 12/2015 | Jeong et al. | |
| 2016/0095156 | A1 | 3/2016 | Mitra et al. | |
| 2016/0278132 | A1 | 9/2016 | Baek et al. | |
| 2016/0345149 | A1 | 11/2016 | Chuttani et al. | |
| 2017/0280422 | A1 | 9/2017 | Prabhakar et al. | |
| 2017/0289860 | A1 | 10/2017 | Wang | |
| 2017/0311151 | A1 | 10/2017 | Ohashi et al. | |
| 2018/0084401 | A1* | 3/2018 | Mbonye | H04W 48/16 |

(Continued)

*Primary Examiner* — Eunsook Choi

(57) ABSTRACT

A network device receives, from a user equipment (UE), a Fifth Generation (5G) New Radio (NR) network attach request, wherein the 5G NR network attach request includes a Voice over Long Term Evolution (VoLTE) network attach request. The network device initiates attachment procedures, in response to receipt of the 5G NR network attach request and the VoLTE network attach request, to attach the UE to the 5G NR network and to a VoLTE network, and initiates establishment of a connection between the 5G NR network and the UE.

20 Claims, 29 Drawing Sheets

(56) References Cited

U.S. PATENT DOCUMENTS

| | | | |
|---|---|---|---|
| 2018/0227960 A1 | 8/2018 | Belghoul et al. | |
| 2019/0069229 A1* | 2/2019 | Lee et al. | |
| 2019/0069327 A1* | 2/2019 | Kim | H04W 76/10 |
| 2019/0098684 A1 | 3/2019 | Tamura | |
| 2019/0159029 A1 | 5/2019 | Li et al. | |
| 2019/0239271 A1* | 8/2019 | Guerzoni | H04W 76/16 |
| 2019/0268895 A1* | 8/2019 | Keller | H04W 48/02 |
| 2019/0313229 A1 | 10/2019 | Chiang et al. | |
| 2019/0364412 A1 | 11/2019 | Huang-Fu et al. | |
| 2020/0280836 A1 | 9/2020 | Velev et al. | |
| 2020/0413297 A1 | 12/2020 | Chiang et al. | |
| 2021/0136859 A1* | 5/2021 | Yoo | H04W 76/27 |

* cited by examiner

NEXT GENERATION TO VOLTE FALLBACK FOR VOICE CALLS

RELATED APPLICATION

The present application is a continuation of, and claims priority to, U.S. application Ser. No. 16/003,144 entitled "Next Generation to VoLTE Fallback for Voice Calls," filed Jun. 8, 2018, the contents of which are incorporated by reference herein in their entirety.

BACKGROUND

Long Term Evolution (LTE) is a mobile telecommunications standard, promulgated by the European Telecommunications Standards Institute (ETSI), for wireless communication involving mobile user equipment, such as mobile devices and data terminals. LTE networks include existing Fourth Generation (4G), and 4.5 Generation (4.5G) wireless networks. The goals of LTE included increasing the capacity and speed of wireless data networks, and redesigning and simplifying the network architecture to an Internet Protocol (IP)-based system with reduced latency compared to the Third Generation (3G) network architecture.

Next Generation mobile networks have been proposed as the next evolution of mobile wireless networks, such as the existing 4G and 4.5G LTE mobile networks. Next Generation mobile networks, such as Fifth Generation New Radio (5G NR) mobile networks, are expected to operate in the higher frequency ranges, and such networks are expected to transmit and receive in the GigaHertz band with a broad bandwidth near 500-1,000 MegaHertz. The expected bandwidth of Next Generation mobile networks is intended to support download speeds of up to about 35-50 Gigabits per second. The proposed 5G mobile telecommunications standard, among other features, operates in the millimeter wave bands (e.g., 28, 38, and 60 GigaHertz (GHz)), and supports more reliable, massive machine communications (e.g., machine-to-machine (M2M), Internet of Things (IoT)). Next Generation mobile networks, such as those implementing the 5G mobile telecommunications standard, are expected to enable a higher utilization capacity than current wireless systems, permitting a greater density of wireless users, with a lower latency. Next Generation mobile networks, thus, are designed to increase data transfer rates, increase spectral efficiency, improve coverage, improve capacity, and reduce latency.

The Internet Protocol (IP) multimedia subsystem (IMS), defined by the 3$^{rd}$ Generation Partnership Project (3GPP), is an architectural framework for implementing IP-based telephony and multimedia services. IMS defines a set of specifications that enables the convergence of voice, video, data and mobile technology over an all IP-based network infrastructure. In particular, IMS fills the gap between the two most successful communication paradigms—cellular and Internet technology, by providing Internet services everywhere using cellular technology in a more efficient way. Session Initiation Protocol (SIP) is the main protocol for IMS. SIP is an application layer control (signaling) protocol for creating, modifying and terminating sessions (e.g., voice sessions) with one or more participants.

A Voice over Long Term Evolution (VoLTE) network is based on the IMS network and provides Internet Protocol (IP) based voice and data service via a network complying with the LTE standard. VoLTE has more voice and data capacity than other wireless networks, while using less available bandwidth due to the use of smaller packet headers.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

For initial Next Generation Mobile network deployments, such as 5G NR deployments, VoLTE may not be supported by the 5G NR network. Currently, the 3GPP 5G NR standard does not permit user equipment to move from the 5G NR network to a 4G LTE network for voice calling using VoLTE. A preferable solution to enabling VoLTE voice calls to 5G NR connected user equipment would be to avoid the user equipment having to monitor or tune away to the 4G LTE network so as to receive incoming voice pages and perform LTE maintenance operations, while on the 5G NR network. Such operations unavoidably increase user equipment device complexity and negatively impact user equipment battery life. Exemplary embodiments described herein modify the 5G NR standard to permit the simultaneous network attachment of user equipment to a Next Generation Mobile network and a VoLTE network, thus, enabling VoLTE voice calls to be originated from Next Generation Mobile network-connected user equipment, and to be terminated at the Next Generation Mobile network-connected user equipment, using signaling additions to the 5G NR standard.

Figure 1:
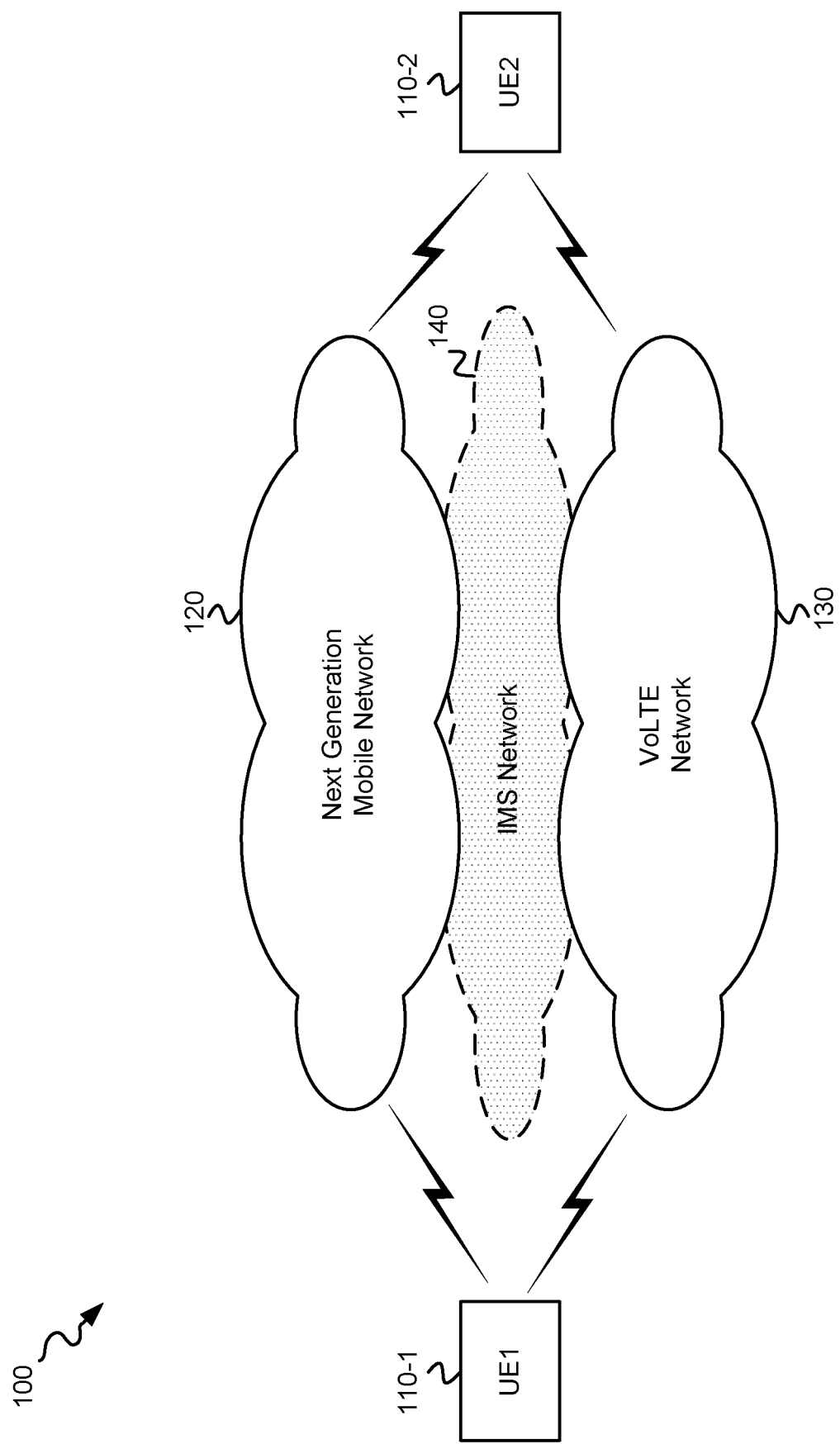
FIG. 1 depicts an exemplary network environment in which a Next Generation Mobile network-connected user equipment may send and/or receive voice calls via a co-located VoLTE network.

FIG. 1 depicts an exemplary network environment 100 in which a Next Generation network-connected user equipment (UE) may send and/or receive voice calls via a co-located VoLTE network. As shown, network environment 100 includes a first UE 110-1 and a second UE 110-2 (generically referred to herein as "UE 110" or "UEs 110"), a Next Generation Mobile network 120, a VoLTE network 130, and an IMS network 140.

UEs 110 may include any type of computational device that communicates via networks 120, 130, and 140. UEs 110 may each include, for example, a computer (e.g., desktop, laptop, tablet, or wearable computer), a personal digital assistant (PDA), a "smart" phone, or a "Machine-to-Machine" (M2M) or "Internet of Things" (IoT) device. A "user" (not shown) may own, operate, administer, and/or carry each UE 110.

Next Generation Mobile network 120 includes any type of a Next Generation Mobile network that includes evolved network components (e.g., future generation components) relative to an LTE network, such as a 4G or 4.5G mobile network. In one implementation, Next Generation Mobile network 120 may include a 5G mobile network. VoLTE network 130 includes any type of a PLMN or satellite network that implements a LTE mobile telecommunications standard, such as the 4G or 4.5G LTE standard, and which further implements the Voice over LTE Voice over Internet Protocol standard. IMS network 140 includes a network that uses the Session Initiation Protocol (SIP) for voice and multimedia session control, such as for creating, modifying and terminating sessions between devices (e.g. UEs 110-1 and 110-2).

The configuration of network components of network environment 100 shown in FIG. 1 is for illustrative purposes. Other configurations may be implemented. Therefore, network environment 100 may include additional, fewer and/or different components that may be configured in a different arrangement than that depicted in FIG. 1. For example, network environment 100 may include numerous UEs (e.g., UEs 110-1 through 110-x, where x>2).

Figure 2A:
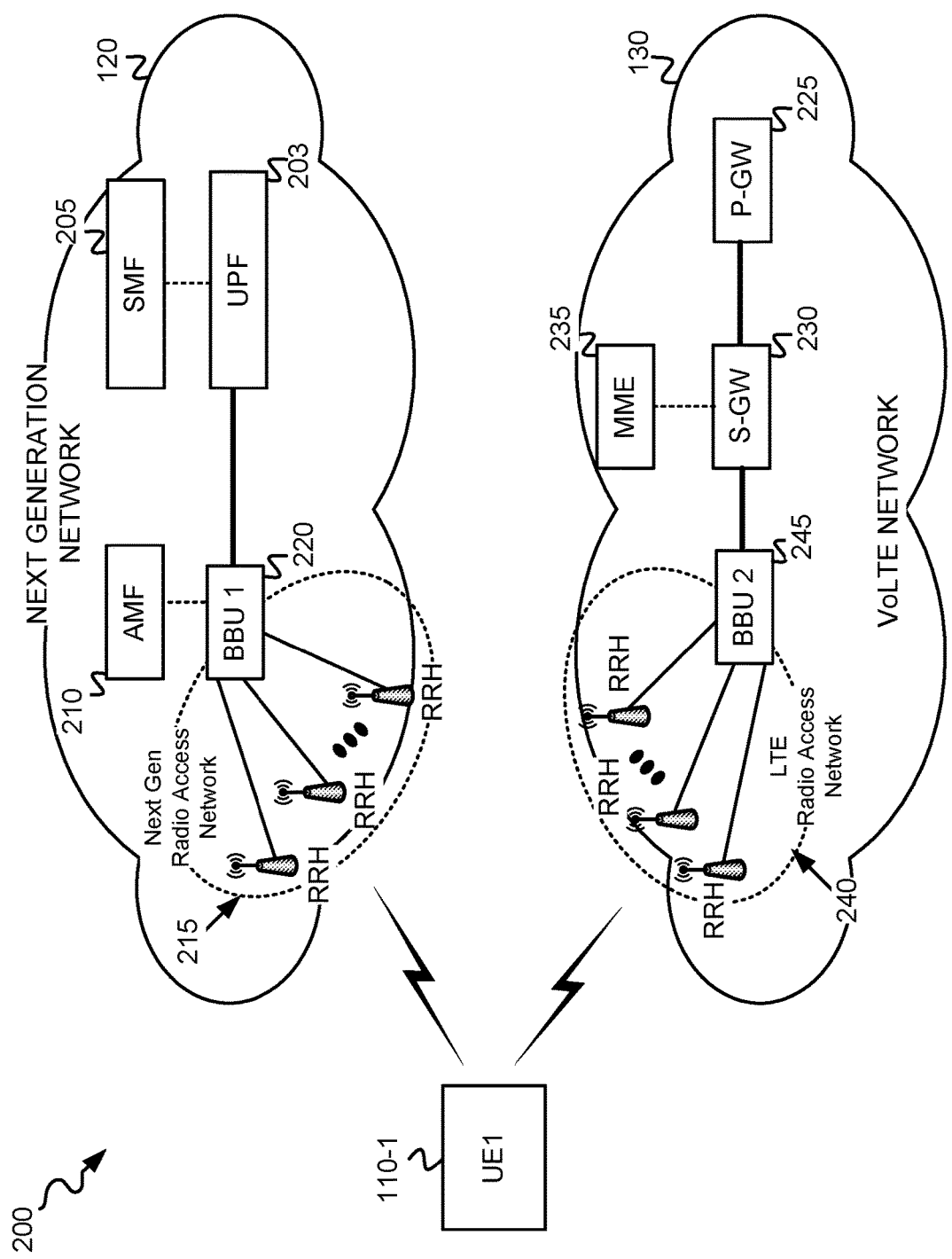
FIG. 2A depicts details of an exemplary portion of the network environment of FIG. 1 that includes the Next Generation Mobile network and the VoLTE network.

FIG. 2A depicts details of an exemplary portion 200 of network environment 100 of FIG. 1 that includes Next Generation Mobile network 120 and VoLTE network 130. In the portion 200 shown in FIG. 2A, Next Generation Mobile network 120 includes, among other nodes, a User Plane Function (UPF) node 203, a Session Management Function (SMF) node 205, an Access Management Function (AMF) node, and a Next Generation Radio Access Network (RAN) 215.

UPF node 203 includes a network device that acts as a router and a gateway between Next Generation Mobile network 120 and an external packet data network (not shown), and forwards session data between the external packet data network and a base band unit in Next Generation Mobile network 120. Next Generation Mobile network 120 may include multiple UPF devices 203 disposed at various geographic locations in network 120. SMF node 205 includes a network device that performs session management, allocates network addresses to UEs 110, and selects and controls the UPF device 203 for data transfer. AMF node 210 includes a network device that performs UE-based authentication, authorization, and mobility management for UEs 110.

Next Generation Radio Access Network (RAN) 215 may include a first base band unit (BBU1) 220 and multiple remote radio heads (RRHs). Next Generation RAN 215 may also include one or more additional base band units (BBUs) and RRHs, and other wireless nodes and components, not shown in FIG. 2. BBU1 220 may connect to the multiple RRHs via, for example, optical fibers. BBU1 220 includes a network device that operates as a digital function unit that transmits digital baseband signals to the multiple RRHs, and receives digital baseband signals from the multiple RRHs. If BBU1 220 is connected to the multiple RRHs via, for example, optical fibers, then BBU1 220 may convert the digital baseband signals into corresponding optical signals for transmission to the RRHs, and may receive optical signals from the RRHs and convert the optical signals into corresponding digital baseband signals.

The RRHs include network devices that operate as radio function units that transmit and receive radio frequency (RF) signals to/from UEs 110. If the RRHs are connected to BBU1 220 via an optical fiber, the RRHs may convert received RF signals to optical signals, and transmit the optical signals to BBU1 220. Additionally, the RRHs may receive optical signals from BBU1 220 via the optic fiber, convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 110, and to transmit wireless RF signals to UE 110. If Next Generation Mobile network 120 is a 5G New Radio (NR) network, BBU1 220 and a RRH represent a distributed Next Generation NodeB, which may also be referred to as a "gNB," or an enhanced LTE (eLTE) eNB that can connect to Next Generation Mobile network 120.

As further shown in the network portion 200 of FIG. 2A, VoLTE network 130 includes, among other nodes, a Packet Gateway node (P-GW) 225, a Serving Gateway node (S-GW) 230, a Mobility Management Entity node (MME) 235, and an LTE RAN 240.

Packet Gateway node (P-GW) 225 includes a network device that acts as a router and a gateway between VoLTE network 130 and the external packet data network (not shown), and forwards session data between the packet data network and a base band unit in VoLTE network 130. Serving Gateway node (S-GW) 230 includes a network device that routes and forwards session data between P-GW 225 and a LTE RAN 240 serving the session's destination UE 110.

Mobility Management Entity node (MME) 235 includes a network device that acts as a control entity for VoLTE network 130, including communicating with a HSS (not shown in FIG. 2) of VoLTE network 130 for user/device authentication and for user/device profile download. MME node 235 further provides UEs 110 with mobility management and session management functions using, for example, Network Access Stratum (NAS) signaling.

LTE RAN 240 may include a second base band unit (BBU2) 245 and multiple remote radio heads (RRHs). LTE RAN 240 may include one or more additional base band units (BBUs) and RRHs, and other wireless nodes and components, not shown in FIG. 2. BBU2 245 may connect to the multiple RRHs via, for example, optical fibers. BBU2 245 includes a network device that operates as a digital function unit that transmits digital baseband signals to the multiple RRHs, and receives digital baseband signals from the multiple RRHs. If BBU2 245 is connected to the multiple RRHs via, for example, optical fibers, then BBU2 245 may convert the digital baseband signals into corresponding optical signals for transmission to the RRHs, and may receive optical signals from the RRHs and convert the optical signals into corresponding digital baseband signals.

The RRHs include network devices that operate as radio function units that transmit and receive radio frequency (RF) signals to/from UEs 110. If the RRHs are connected to BBU2 245 via an optical fiber, the RRHs may convert received RF signals to optical signals, and transmit the optical signals to BBU2 245. Additionally, the RRHs may receive optical signals from BBU2 245 via the optic fiber, convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 110, and to transmit wireless RF signals to UE 110. If VoLTE network 130 is a 4G LTE network, BBU2 245 and a RRH represent a distributed evolved NodeB (eNB).

FIG. 2A illustrates a single exemplary implementation of the configuration of the components of Next Generation Mobile network 120 and VoLTE network 130. Other components and configurations of Next Generation Mobile network 120 and VoLTE network 130 may, however, may be implemented. Therefore, Next Generation Mobile network 120 and VoLTE network 130 may each include additional, fewer and/or different components, that may be configured differently, than depicted in FIG. 2A and described herein. For example, though only a single base band unit BBU 1 220, and a single base band unit BBU 2 245, are shown as components of Next Generation RAN 215 and LTE RAN 240, respectively, each of Next Generation RAN 215 and LTE RAN 240 may include multiple base band units (i.e., >1 base band unit), with each of the multiple base band units further connecting to at least one RRH.

Figure 2B:
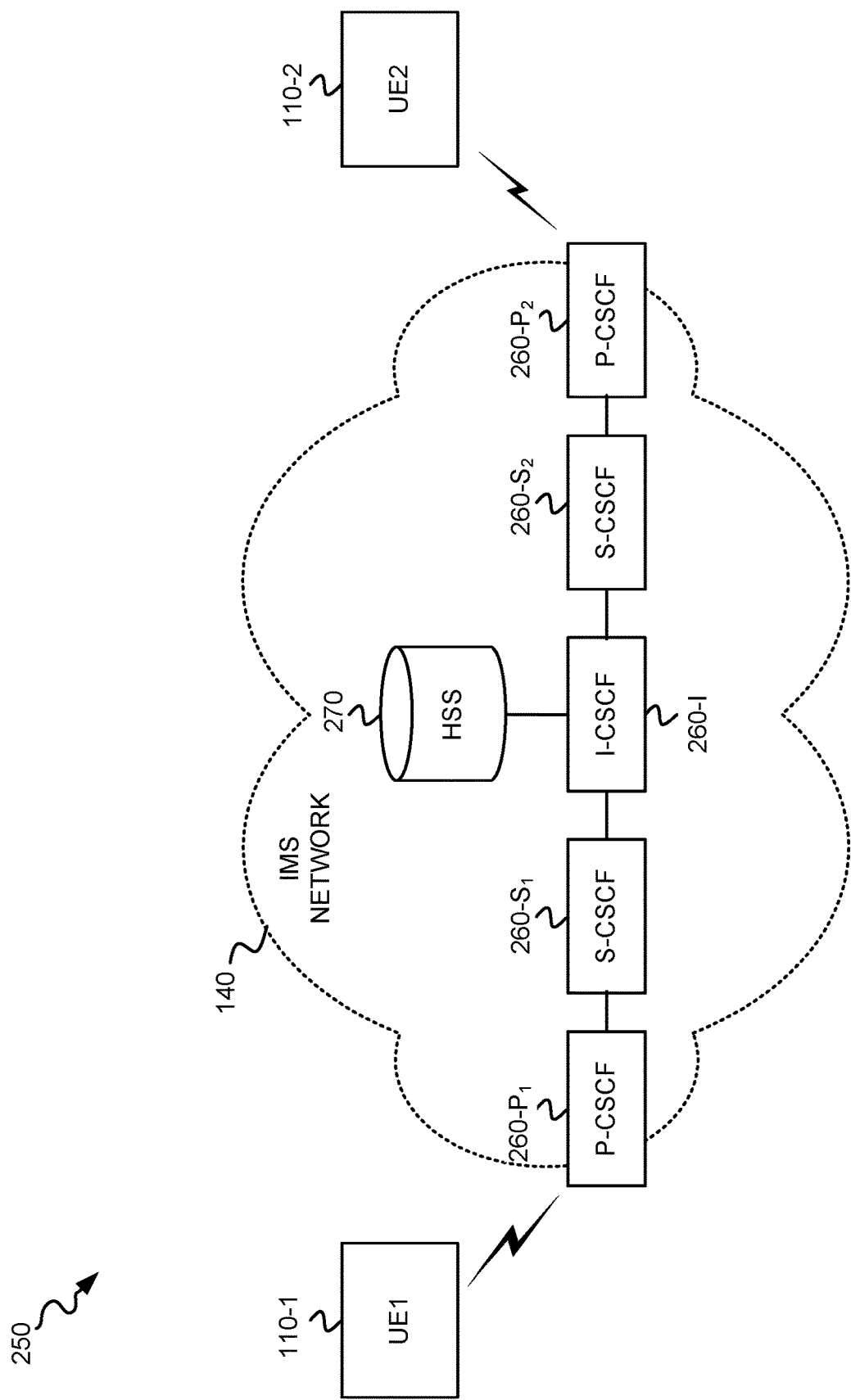
FIG. 2B depicts another portion of the network environment of FIG. 1, including components of the IMS network.

FIG. 2B depicts another portion 250 of the network environment 100 of FIG. 1, including components of IMS network 140. As shown, IMS network 140 may include a Proxy Call Session Control Function (P-CSCF) 260-$P_1$, a serving Call Session Control Function (S-CSCF) 260-$S_1$, an Interrogating Call Session Control Function I-CSCF 260-I, a S-CSCF 260-$S_2$, a P-CSCF 260-$P_2$, and a Home Subscriber Server (HSS) 270. P-CSCF 260-$P_1$, S-CSCF 260-$S_1$, I-CSCF 260-I, S-CSCF 260-$S_2$, and P-CSCF 260-$P_2$ may be generically and individually referred to herein as "CSCF 260".

P-CSCF 260-$P_1$ acts as an edge of IMS network 140 through which UE 110-1 obtains access. P-CSCF 260-$P_1$ maintains an awareness of all IMS endpoints that are currently registered with IMS network 140, and performs various manipulations of SIP signaling messages that are arriving from, or being sent to, the IMS endpoints (e.g, UEs 110-1 and 110-2). P-CSCF 260-$P_1$ maintains a connection with S-CSCF 260-$S_1$.

S-CSCF 260-$S_1$ processes all originating and terminating SIP requests and responses associated with endpoints registered with S-CSCF 260-$S_1$ (including UE 110-1). S-CSCF 260-$S_1$ routes the SIP signaling towards its destination (e.g., towards P-CSCF 260-$P_1$ and UE 110-1), or towards UE 110-2 via I-CSCF 260-I. I-CSCF 260-I passes SIP signaling to/from S-CSCF 260-$S_1$ and S-CSCF 260-$S_2$. I-CSCF 260-I queries HSS 270 to learn the identity of the S-CSCF assigned to a given UE 110 so that it can properly forward the SIP signaling. HSS 270 includes a master user database (DB) that supports all of CSCFs 260 of IMS network 140. The master user DB of HSS 270 stores user subscription-related information (e.g., subscriber profiles), and performs authentication and authorization of the user. The subscriber profiles stored in the DB of HS 270 may include an indication of whether a given user has subscribed to usage of VoLTE network 130 and/or Next Generation Mobile Network 120.

S-CSCF 260-$S_2$ processes all originating and terminating SIP requests and responses associated with endpoints registered with S-CSCF 260-$S_2$ (including UE 110-2). S-CSCF 260-$S_2$ routes the SIP signaling towards its destination (e.g., towards P-CSCF 260-$P_2$ and UE 110-2), or towards UE 110-1 via I-CSCF 2610-I. P-CSCF 260-$P_2$ acts as an edge of IMS network 140 through which UE 110-2 obtains access. P-CSCF 260-$P_2$ maintains an awareness of all IMS endpoints that are currently registered with IMS network 140, and performs various manipulations of SIP signaling messages that are arriving from, or being sent to, the IMS endpoints (e.g., UEs 110-1 and 110-2). P-CSCF 260-$P_2$ maintains a connection with S-CSCF 260-$S_2$. S-CSCF 260-$S_1$ and S-CSCF 260-$S_2$ may obtain subscriber profile information from HSS 270 to determine whether UE 110-1 and/or UE 110-2 are subscribed for usage of VoLTE network 130 and/or Next Generation Mobile Network 120.

P-CSCF 260-$P_1$, S-CSCF 260-$S_1$, I-CSCF 260-I, S-CSCF 260-$S_2$, and/or P-CSCF 260-$P_2$ may each include functionality implemented in multiple, different network devices, or in a same, single network device.

The configuration of network components of portion 250, of the network environment 100 of FIG. 1, shown in FIG. 2B is for illustrative purposes. Other configurations may be implemented. Therefore, portion 250 may include additional, fewer and/or different components that may be configured in a different arrangement than that depicted in FIG. 2B.

Figure 3:
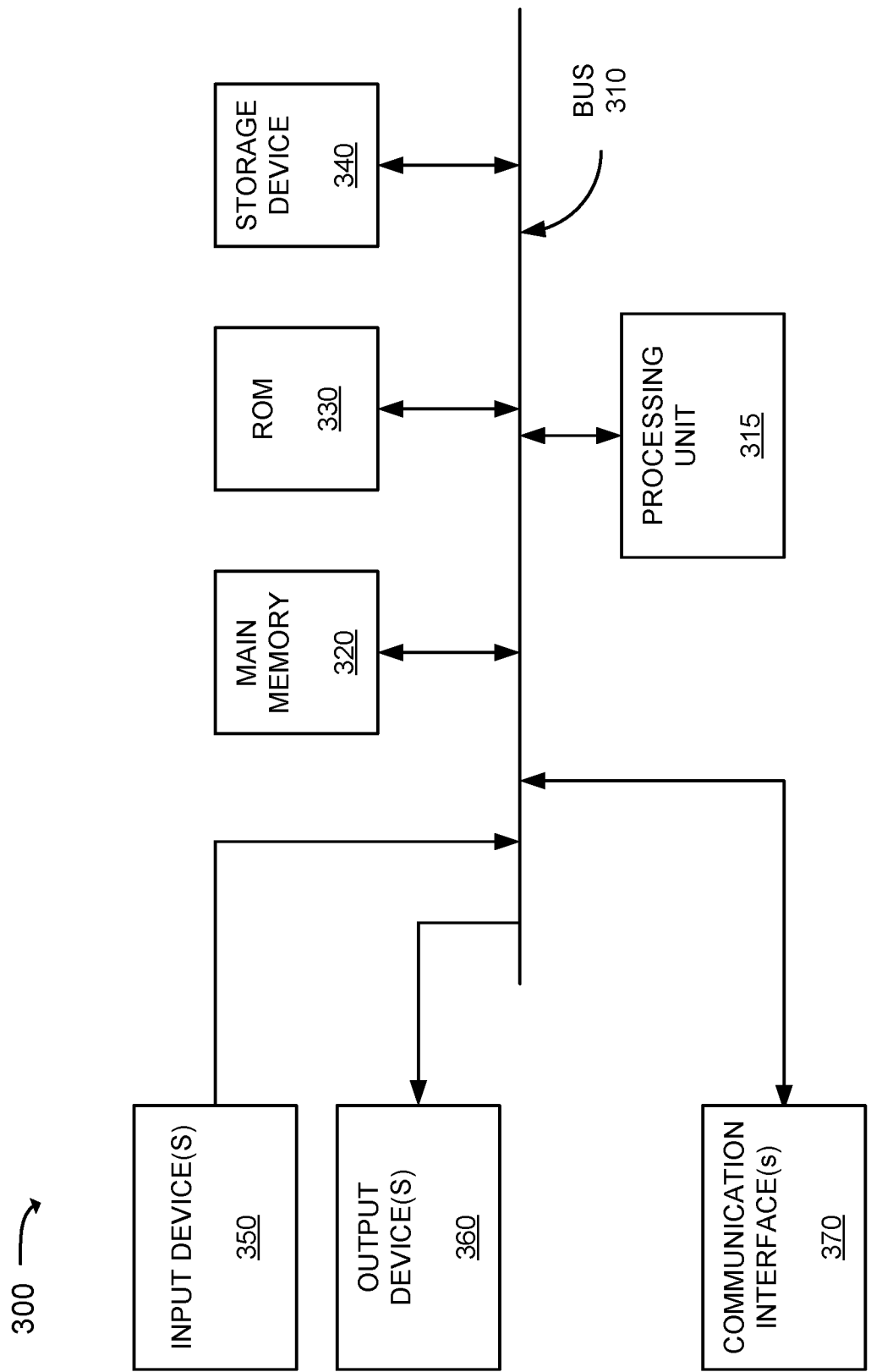
FIG. 3 is a diagram of exemplary components of a network device that may correspond to various devices/nodes of FIG. 1.

FIG. 3 is a diagram of exemplary components of a network device 300. Network device 300 may correspond to UE 110, UPF node 200, SMF node 205, AMF node 210, BBU 1 220, BBU 2 245, P-GW node 225, S-GW node 230, HSS 270, P-CSCF 260-P, S-CSCF 260-S, I-CSCF 260-I, and/or MME node 235. Network device 300 may include a bus 310, a processing unit 315, a main memory 320, a read only memory (ROM) 330, a storage device 340, an input device 350, an output device 360, and a communication interface(s) 370. Bus 310 may include a path that permits communication among the elements of network device 300.

Processing unit 315 may include one or more processors or microprocessors which may interpret and execute stored instructions associated with one or more processes, or processing logic that implements the one or more processes. For example, processing unit 315 may include, but is not limited to, programmable logic such as Field Programmable Gate Arrays (FPGAs) or accelerators. Processing unit 315 may include software, hardware, or a combination of software and hardware for executing the processes described herein. Main memory 320 may include a random access memory (RAM) or another type of dynamic storage device that may store information and, in some implementations, instructions for execution by processing unit 315. ROM 330 may include a Read Only Memory (ROM) device or another type of static storage device (e.g., Electrically Erasable Programmable ROM (EEPROM)) that may store static information and, in some implementations, instructions for use by processing unit 315. Storage device 340 may include a magnetic and/or optical recording medium and its corresponding drive. Main memory 320, ROM 330 and storage device 340 may each be referred to herein as a "non-transitory computer-readable medium" or a "non-transitory storage medium."

Input device 350 may include one or more devices that permit a user or operator to input information to network device 300, such as, for example, a keypad or a keyboard, a display with a touch sensitive panel, voice recognition and/or biometric mechanisms, etc. Output device 360 may include one or more devices that output information to the operator or user, including a display, a speaker, etc. Input device 350 and output device 360 may, in some implementations, be implemented as a graphical user interface (GUI) that displays GUI information and which receives user input via the GUI. In some implementations, such as when network device 300 is a UPF node 200, SMF node 205, AMF node 210, P-GW node 225, S-GW node 230, or MME node 235, input device 350 and/or output device 360 may be omitted from network device 300.

Communication interface(s) 370 may include one or more transceivers that enable network device 300 to communicate with other devices and/or systems. For example, in the case where network device 300 is a UE 110, communication interface(s) 370 may include a wireless transceiver (including at least one antenna) for communicating with one or more RRHs of Next Generation RAN 215 or LTE RAN 240. In some implementations, communication interface(s) 370 may include a Global Positioning System (GPS) device that can determine the geographic location of network device 300 (e.g., a current geographic location of a UE 110). In the cases of UPF node 200, SMF node 205, AMF node 210, P-GW node 225, S-GW node 230, MME node 235, BBU 1 220 and BBU 2 245, communication interface(s) 370 may include at least one wired transceiver for wired communication via Next Generation Mobile network 120 and/or VoLTE network 130. In some implementations, communication interface(s) 370 of BBU 1 220 and BBU 2 245 may include one or more optical transceivers for communicating with RRHs via optical fiber.

Network device 300 may perform certain operations or processes, as may be described herein. Network device 300 may perform these operations in response to processing unit 315 executing software instructions contained in a computer-readable medium, such as memory 320. A computer-readable medium may be defined as a physical or logical memory device. A logical memory device may include memory space within a single physical memory device or spread across multiple physical memory devices. The software instructions may be read into main memory 320 from another computer-readable medium, such as storage device 340, or from another device via communication interface(s) 370. The software instructions contained in main memory 320 may cause processing unit 315 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of network device 300 illustrated in FIG. 3 is for illustrative purposes only. Other configurations may be implemented. Therefore, network device 300 may include additional, fewer and/or different components, arranged in a different configuration, than depicted in FIG. 3.

Figure 4:
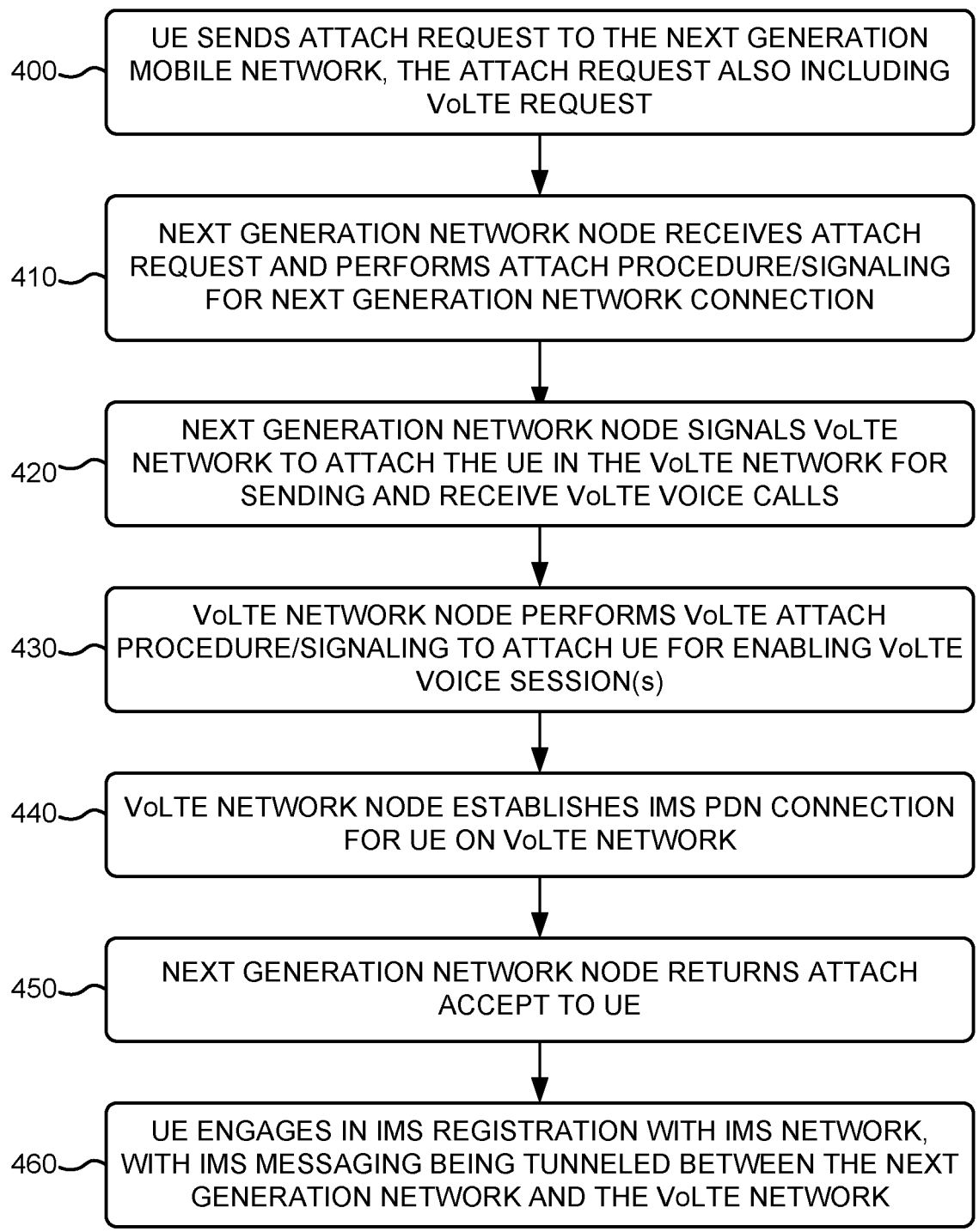
FIG. 4 is a flow diagram of an exemplary process for a user equipment requesting a network attach via a Next Generation Mobile network, where the network attach request additionally includes a request to attach to a VoLTE network for sending and/or receiving voice calls via the VoLTE network.

FIG. 4 is a flow diagram of an exemplary process for a UE 110 requesting a network attach via Next Generation mobile network 120, where the network attach request additionally includes a request to attach to VoLTE network 130 for sending and/or receiving voice calls via VoLTE network 130. The exemplary process of FIG. 4 may be implemented by a Next Generation Mobile network node 500 (shown in FIG. 5) and a VoLTE network node 510 (shown in FIG. 5), in conjunction with a UE 110. The exemplary process of FIG. 4 is described below with reference to the example network environment diagram of FIG. 5.

Figure 5:
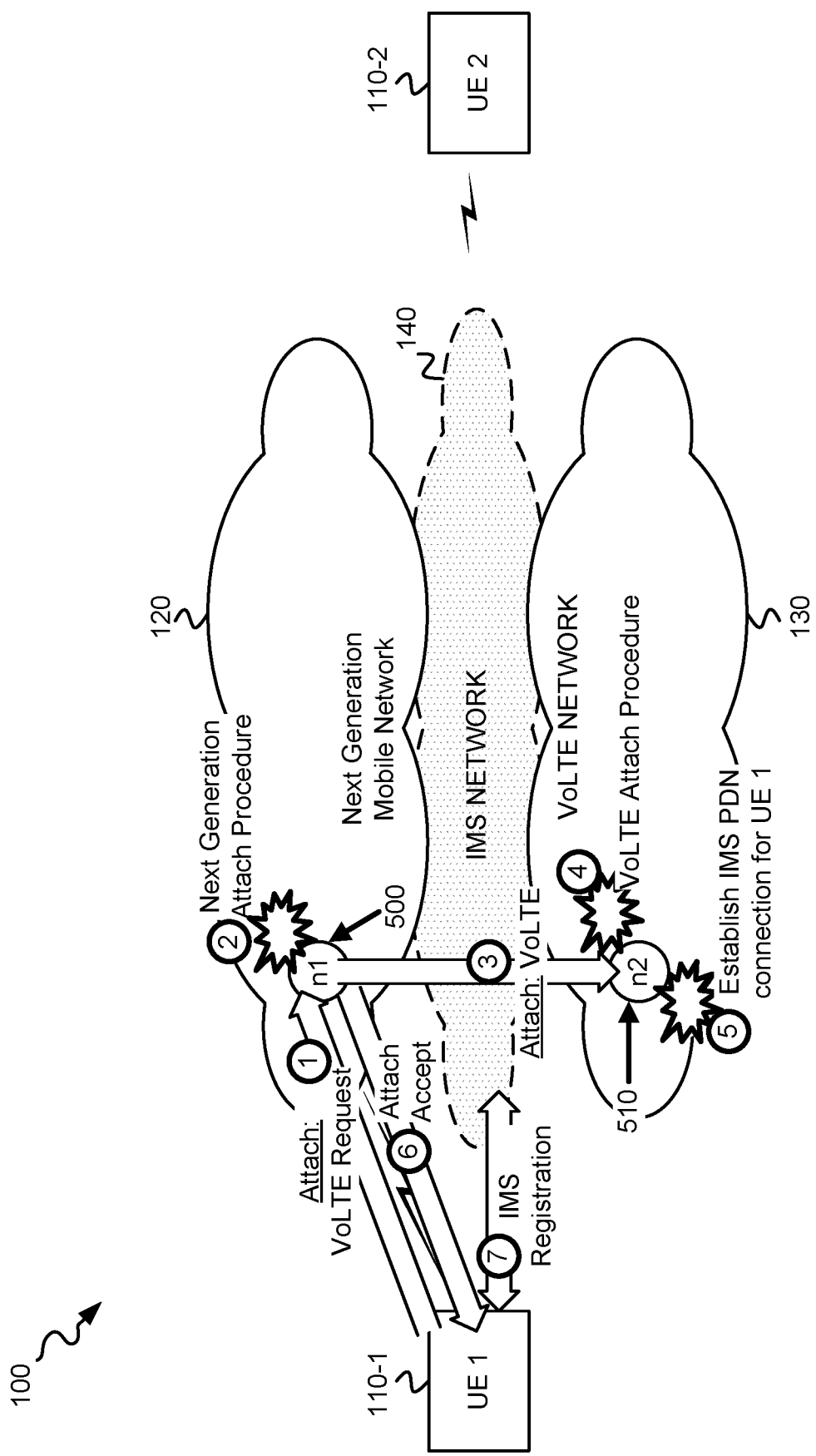
FIG. 5 is an example network environment diagram that illustrates the exemplary process of FIG. 4.

The exemplary process may include UE 110 sending an attach request to Next Generation Mobile network 120, the attach request also including a VoLTE request (block 400). As depicted in FIG. 5, UE 1 110-1 sends a network attach (identified with a sequence number "1" within a circle) to Next Generation network node n1 500 within Next Generation Mobile network 120. Referring back to FIG. 2, in one exemplary implementation, Next Generation network node 500 may be AMF node 210. In other implementations, Next Generation network node 500 may be another node, such as, for example, a RRH, BBU 1 220, SMF node 205, or UPF node 200.

A node in Next Generation Mobile network 120 receives the attach request and performs the attach procedure and signaling for a connection between UE1 110-1 and Next Generation Mobile network 120 (block 410). FIG. 5 shows Next Generation network node n1 500 performing an attach procedure (identified with a sequence number "2" within a circle). The network attach procedure may register UE 1 110-1 with Next Generation Mobile network 120, including UE 1 110-1's current network location, for establishing a session.

The Next Generation Mobile network node signals VoLTE network 130 to attach the UE 110 in VoLTE network 130 for sending and receiving VoLTE voice calls (block 420). FIG. 5 depicts Next Generation network node 500 sending a VoLTE attach (identified with a sequence number "3" within a circle) to VoLTE network node n2 510 in VoLTE network 130. Referring to FIG. 2, in one exemplary implementation, VoLTE network node n2 510 may be MME 235. In other implementations VoLTE network node n2 510 may be another node, such as, for example, an RRH, BBU 2 245, S-GW 230, or P-GW 225.

A VoLTE network node performs a VoLTE attach procedure and signaling to attach the UE 110 in VoLTE network 130 for enabling a VoLTE voice session(s) (block 430). FIG. 5 depicts VoLTE network node n2 510 performing a VoLTE attach procedure (identified with a sequence number "4" within a circle). The VoLTE network attach procedure may register UE 110-1 with VoLTE network 130, including UE 110-1's current network location, for establishing a VoLTE voice call with UE 110-1.

The VoLTE network node establishes an IMS Packet Data Network (PDN) connection for the UE 110 on VoLTE network 130 (block 440). FIG. 5 depicts VoLTE network node n2 510 establishing an IMS PDN connection (identified with a sequence number "5" within a circle). Once RRC connection setup and VoLTE call setup subsequently occurs with VoLTE network 130, the established IMS PDN connection may be used by UE 110 for sending/receiving SIP signaling and streaming voice packets.

The Next Generation Mobile network node returns an attach accept message to the UE 110 (block 450). Upon completion of the VoLTE attach procedure, VoLTE network node n2 510 may return an attach completion message (not shown in FIG. 5) to Next Generation network node n1 500, and Next Generation network node n1 500, in turn, may return an attach accept message (identified with a sequence number "6" within a circle) to the attach requesting UE 110-1, where the attach accept message indicates successful completion of attachment to Next Generation Mobile network 120 and VoLTE network 130. UE 110, upon receipt of the attach accept message, engages in IMS registration with IMS network 140, with IMS messaging being tunneled between Next Generation Mobile Network 120 and VoLTE network 130 (block 460). The IMS registration process enables the UE 110 to send and receive VoLTE calls. Existing IMS registration signaling may be used for registering UE 110 with IMS network 140, with the IMS registration signaling being tunneled from Next Generation Mobile Network 120 to VoLTE network 130 before being forwarded to IMS network 140. For example, the SIP IMS registration messages, sent from UE 110-1, may be encapsulated in a Network Access Stratum (NAS) message between the UE 110-1 and Next Generation Mobile Network 120, and Next Generation Mobile Network 120 (e.g., node n1 500) forwards the SIP IMS registration messages to VoLTE network 130 (e.g., node n2 510). The VoLTE network 130 (e.g., node n2 510) then forwards the SIP IMS registration messages to an appropriate node in IMS network 140, such as, for example, P-CSCF 260-P1. The responsive SIP IMS registration signaling messages, from IMS network 140 to UE 110-1, may return to UE 110-1 via a reverse path from IMS network 140 to VoLTE network 130, tunneling from VoLTE network 130 to Next Generation Mobile Network 120, and on to UE 110-1. FIG. 5 depicts a simplified view of UE 110-1 engaging in IMS registration (identified with a sequence number "7" within a circle) with IMS network 140, which omits the network-to-network tunneling.

Figure 6A:
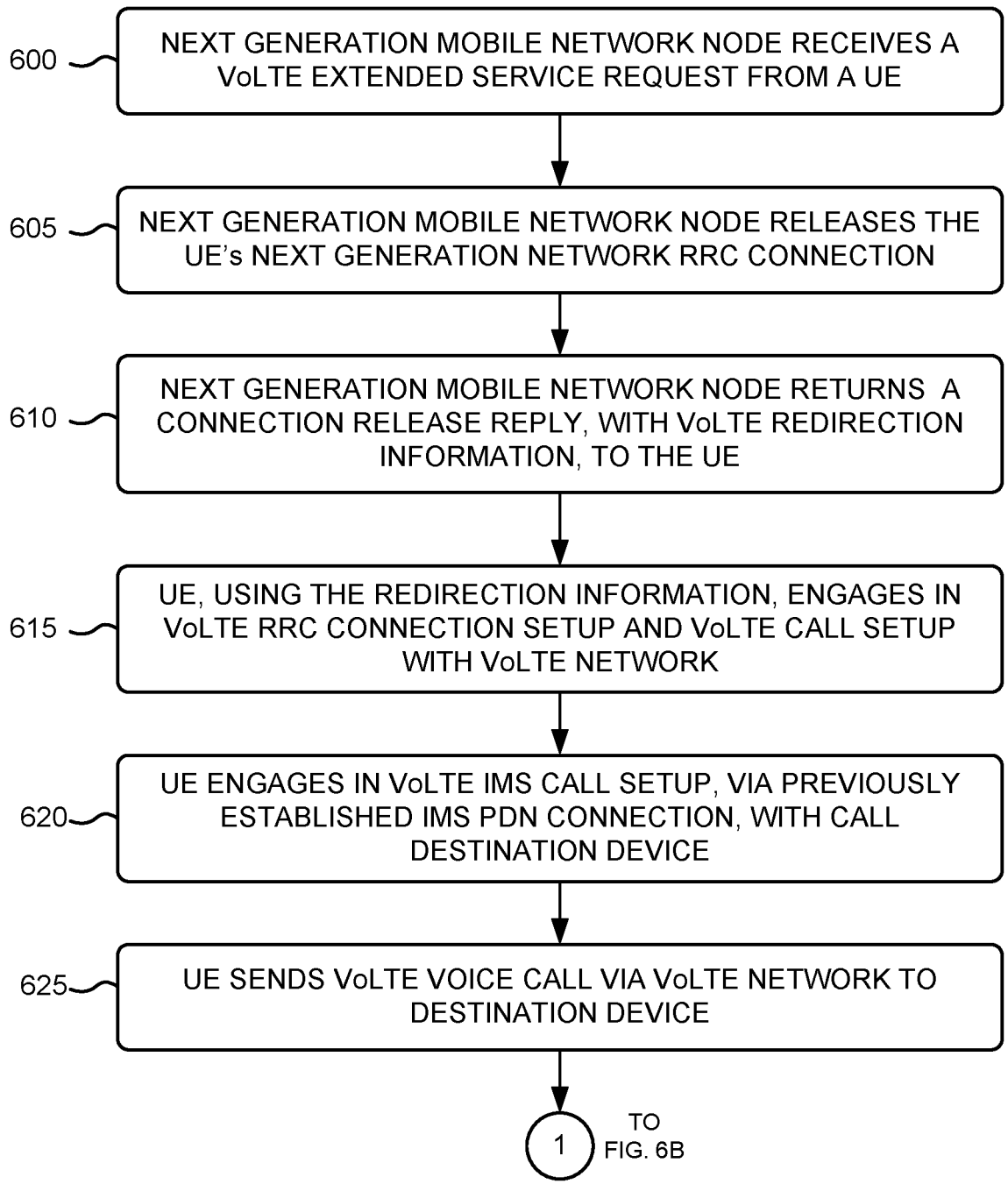
FIGS. 6A and 6B are flow diagrams of an exemplary process for establishing and terminating a VoLTE voice call that originates with a user equipment connected to a Next Generation Mobile network.
Figure 6B:
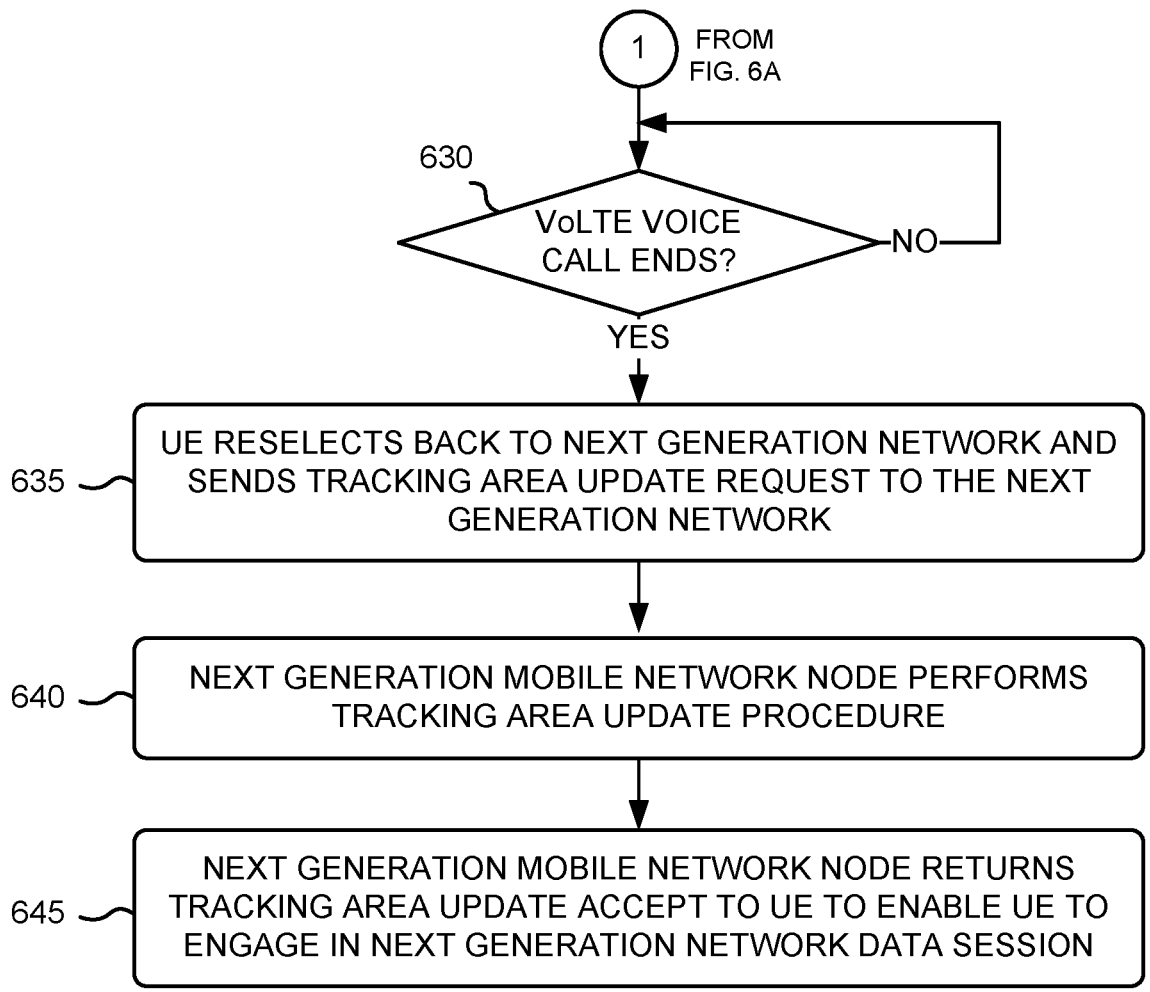

FIGS. 6A and 6B are flow diagrams of an exemplary process for establishing and terminating a VoLTE voice call that originates with a UE 110 connected to Next Generation Mobile Network 120. The exemplary process of FIGS. 6A and 6B may be implemented by Next Generation Mobile network node 500, in conjunction with a UE 110. The exemplary process of FIG. 8 occurs subsequent to execution of the Next Generation network/VoLTE network attach process of FIG. 4, such that UE 110 is already attached to Next Generation Mobile network 120 and to VoLTE network 130. The exemplary process of FIGS. 6A and 6B is described below with reference to the example network environment diagrams of FIGS. 7A-7D.

Figure 7A:
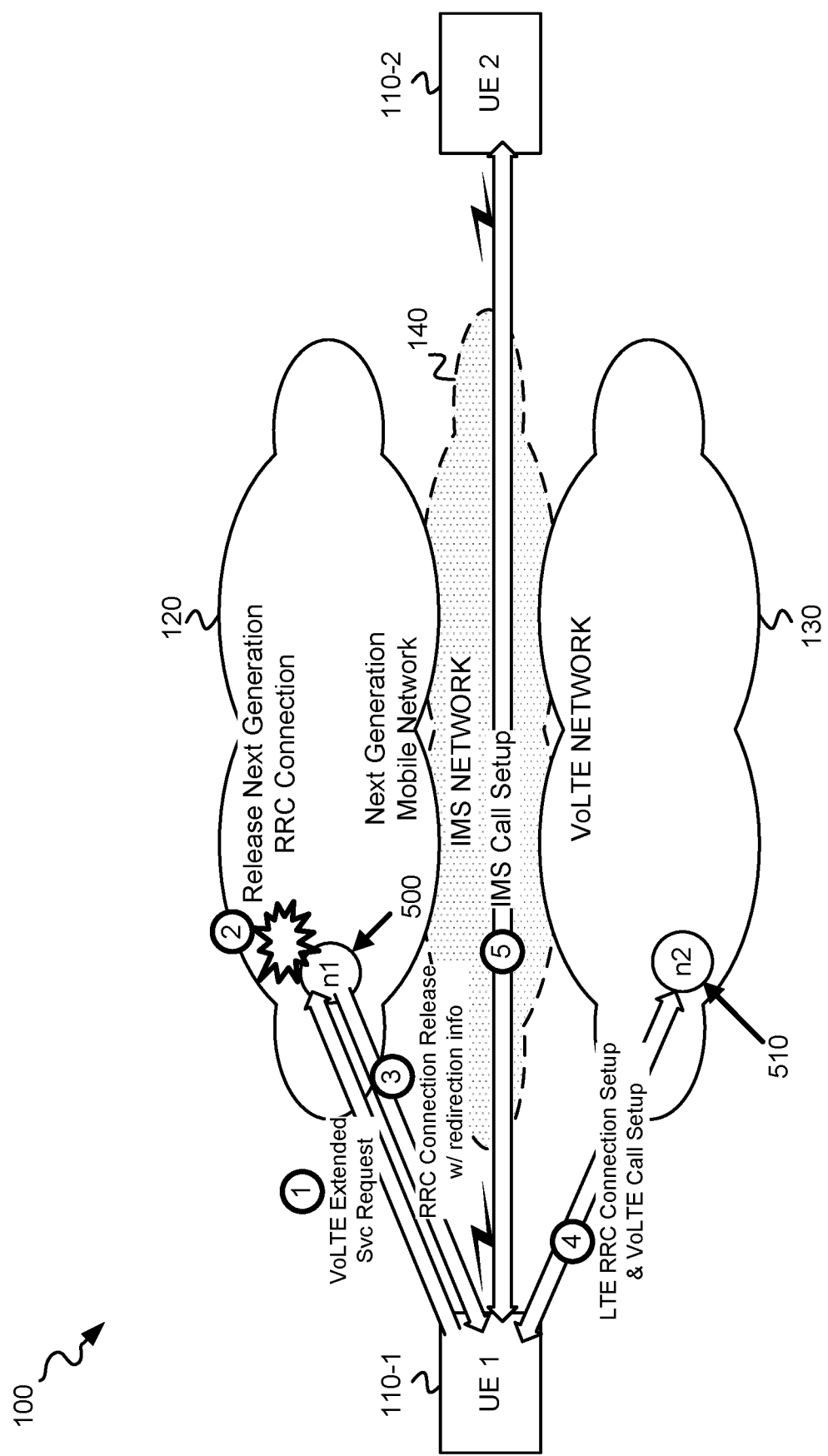
FIGS. 7A-7D are example network environment diagrams that illustrate the exemplary process of FIGS. 6A and 6B.

The exemplary process may include Next Generation mobile network node 500 receiving a VoLTE Extended Service Request from a UE 110 (block 600). Upon receipt of the VoLTE Extended Service Request, Next Generation network node 500 releases the UE 110's Next Generation network Radio Resource Control (RRC) connection (block 605), and then returns a connection release reply, with VoLTE redirection information, to the UE 110 (block 610). FIG. 7A depicts Next Generation network node 500 receiving a VoLTE Extended Service Request message (identified with a sequence number "1" within a circle) from UE 110-1, releasing the Next Generation RRC connection (identified with a sequence number "2" within a circle), and sending a RRC connection release message (identified with a sequence number "3" within a circle) containing VoLTE redirection information to UE 110-1.

UE 110, using the received redirection information, engages in VoLTE RRC connection setup and VoLTE call setup with VoLTE network 130 (block 615). FIG. 7A depicts UE 110-1 engaging in LTE RRC connection setup and VoLTE call setup (identified with a sequence number "4" within a circle) with a VoLTE network node n2 510. In an alternative implementation, the release of the Next Generation RRC connection may be omitted, and the RRC connection release message may be replaced with an alternative message that only includes redirection information for connecting to VoLTE network 130. In this alternative implementation, UE 110-1 may continue with one or more data sessions via Next Generation Mobile network 120, but also engage in VoLTE voice calls via VoLTE network 130.

UE 110 engages in VoLTE IMS call setup, via a previously established IMS PDN connection (established in block 440 of the exemplary process of FIG. 4), with a call destination device (block 620). Existing SIP signaling processes may be used for the VoLTE IMS call setup between UE 110 and the call destination device (e.g., between UE 110-1 and UE 110-2). The VoLTE IMS call setup signaling enables a voice call to be placed between UE 110 and the call destination device. FIG. 7A depicts UE 110-1 engaging in IMS call setup (identified with a sequence number "5" within a circle) with IMS network 140. UE 110-1 may engage in IMS call setup with UE 110-2 via, for example, P-CSCF 260-P$_1$, S-CSCF 260-S$_1$, I-CSCF 260-I, S-CSCF 260-S$_2$, and/or P-CSCF 260-P$_2$ of IMS network 140 of FIG. 2B.

Figure 7B:
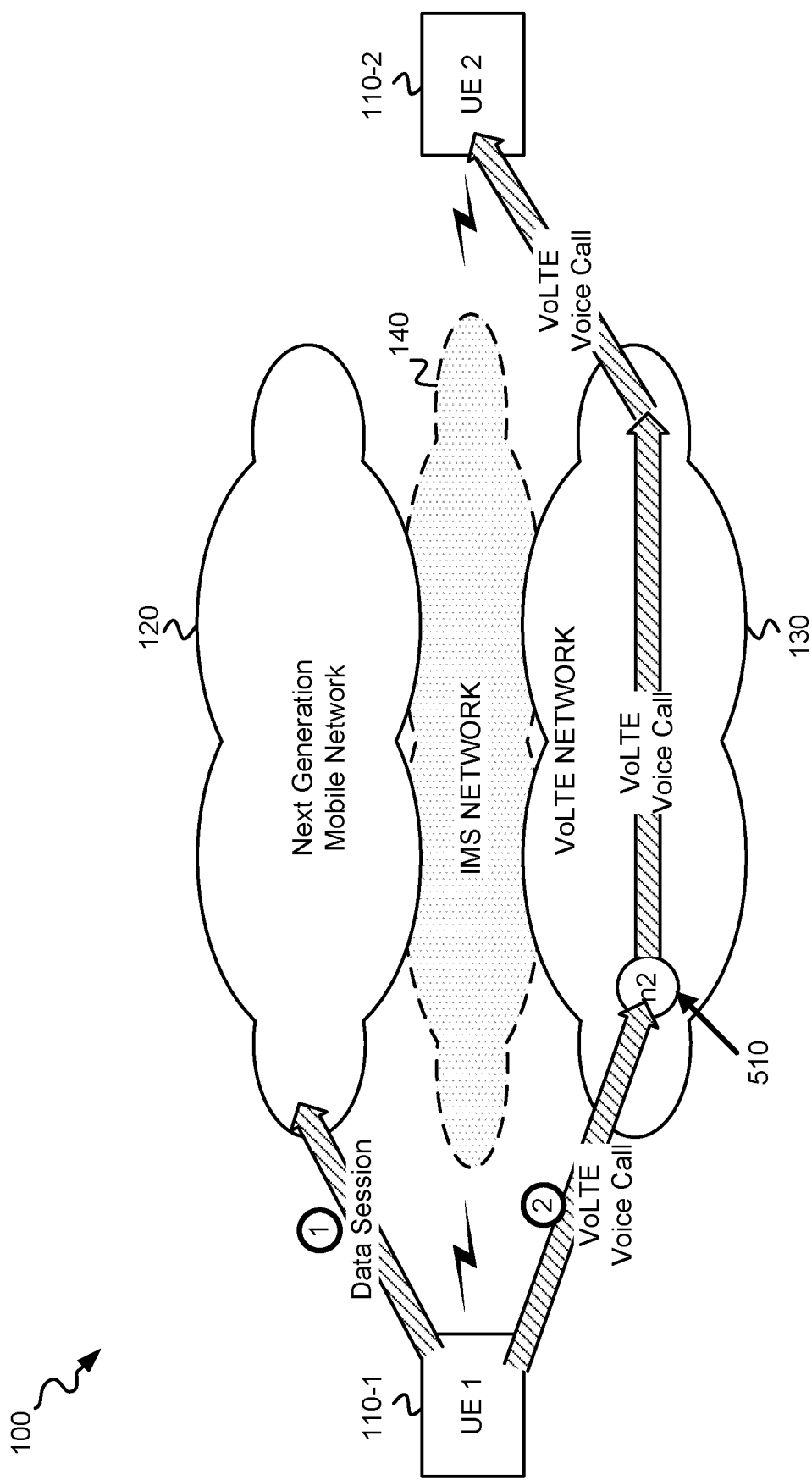

UE 110 sends a VoLTE voice call via VoLTE network 130 to the call destination device (block 625). As shown in FIG. 7B, UE 110-1 may have previously been engaged in a data session (identified with a sequence number "1" within a circle) via Next Generation Mobile network 120 and, subsequent to the LTE RRC connection setup and VoLTE call setup of block 615, UE 110-1 may originate a VoLTE voice call (identified with a sequence number "2" within a circle) via VoLTE network 130. In the alternative implementation in which the Next Generation RRC connection was not released, UE 110-1 may continue to engage in one or more data sessions (identified with a "1" within a circle in FIG. 7B) while simultaneously originating a VoLTE voice call via VoLTE network 130. Additionally, while not shown in FIG. 7B, if VoLTE network 130 supports data delivery, then UE 110-1 may engage in a data session via VoLTE network 130 while the VoLTE voice call is in progress. Subsequent to call setup, a bidirectional flow of voice packets (only one direction of flow is show in FIG. 7B) for the voice call and control signaling may occur between UE 110-1 and the call destination device UE 110-2.

Figure 7C:
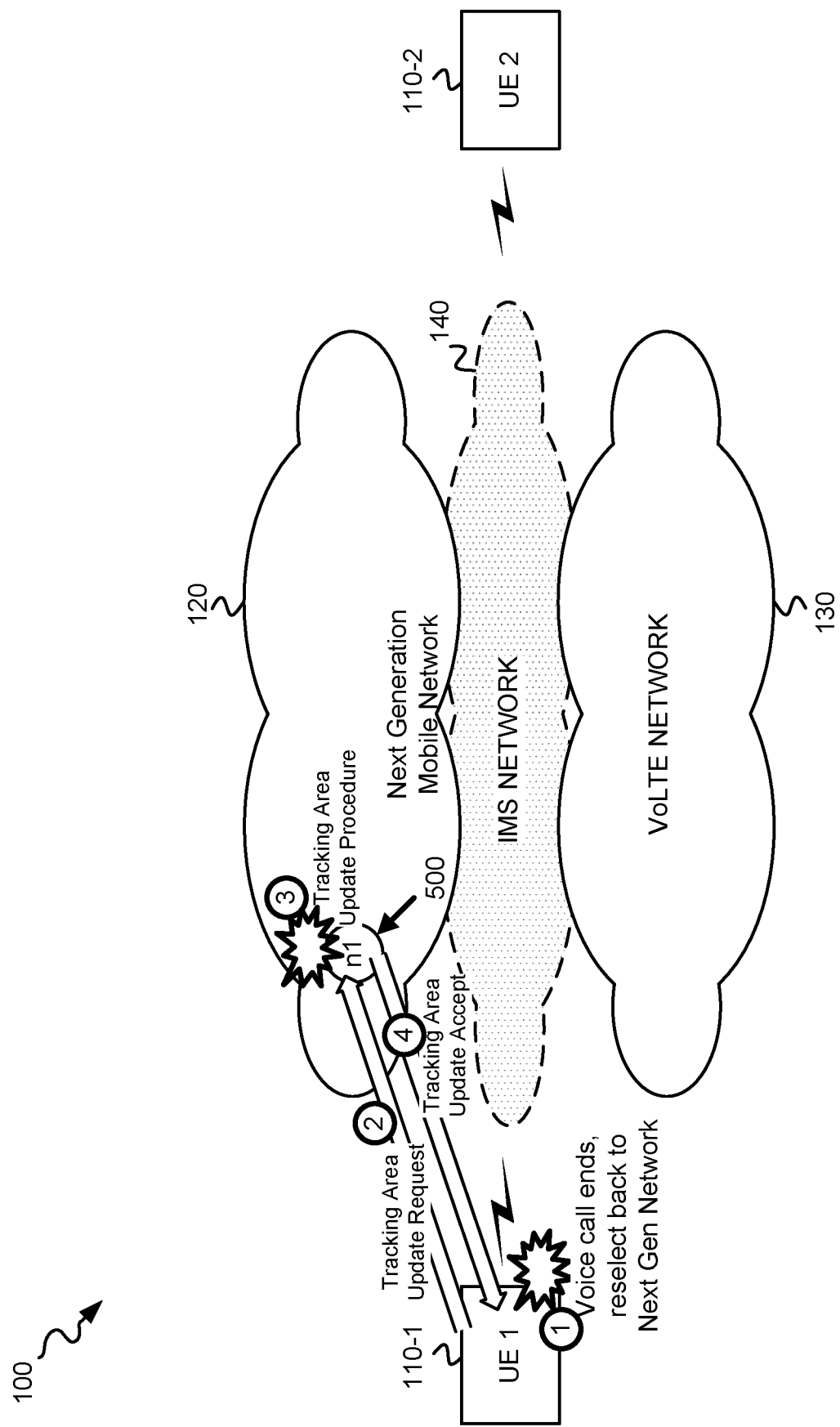

Once the VoLTE voice call ends (YES—block 630), then UE 110 reselects back to Next Generation Mobile network 120, and sends a Tracking Area Update (TAU) request to Next Generation Mobile network 120 (block 635). FIG. 7C depicts the voice call ending, and UE 110-1 reselecting (identified with a "1" within a circle) back to the Next Generation Mobile network 120. FIG. 7C further shows UE 110-1 sending a TAU request (identified with a "2" within a circle) to Next Generation network node n1 500. In the alternative implementation in which the Next Generation RRC was never released, the TAU request, and update procedure of block 635 below, may be omitted from the exemplary process of FIGS. 6A and 6B.

Figure 7D:
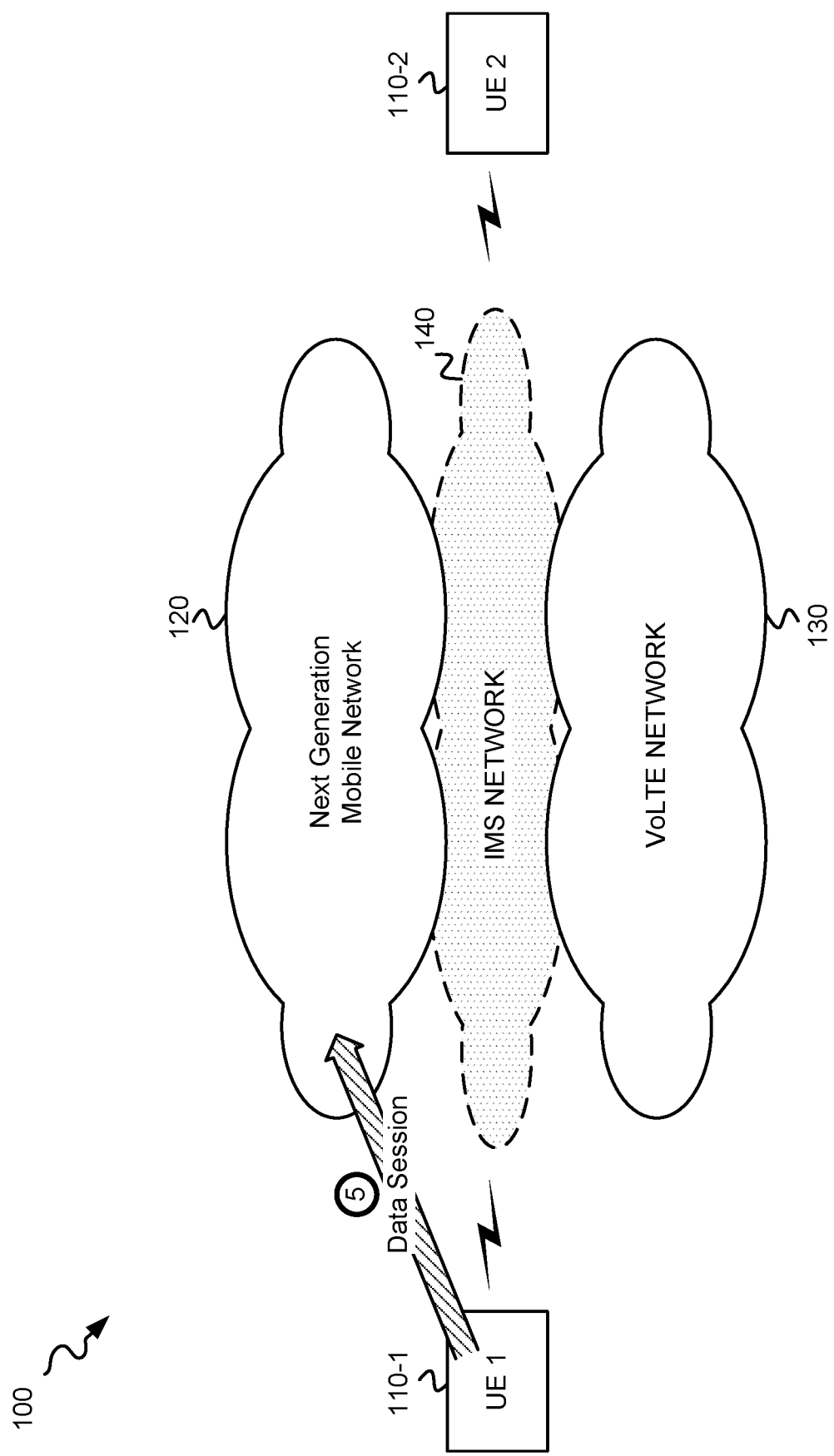

Upon receipt of the TAU request, Next Generation Mobile network node 500 performs the Tracking Area Update procedure (block 640), and returns a TAU accept message to UE 110 to enable UE 110 to engage in a data session with Next Generation Mobile network 120 (block 645). The TAU procedure updates the tracking area (e.g., Tracking Area Identifier) in which the UE 110 is currently located. FIG. 7C depicts Next Generation network node n1 500 performing the TAU procedure (identified with a "3" within a circle) and returning a TAU accept message (identified with a "4" within a circle) to UE 110-1 upon completion of the TAU procedure. FIG. 7D further shows UE 110-1, subsequent to receiving the TAU accept message, engaging in a data session (identified with a "5" within a circle) with Next Generation Mobile network 120.

Figure 8:
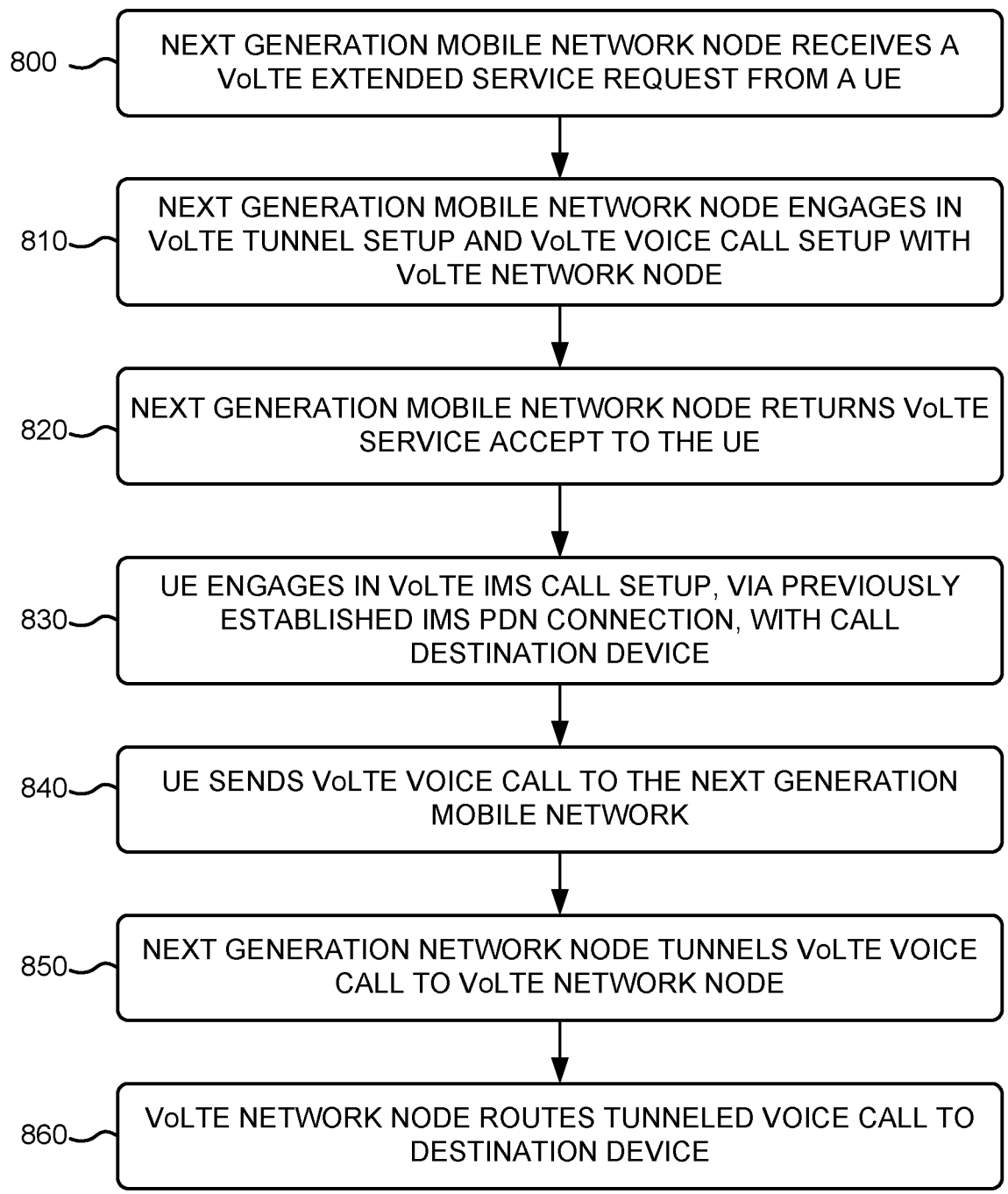
FIG. 8 is a flow diagram of an exemplary process for establishing a tunnel between a Next Generation Mobile network and a VoLTE network for tunneling voice calls between a user equipment and the VoLTE network.

FIG. 8 is a flow diagram of an exemplary process for establishing a tunnel between Next Generation Mobile network 120 and VoLTE network 130 for tunneling voice calls between a UE 110 and VoLTE network 130. The exemplary process of FIG. 8 may be implemented by Next Generation Mobile network node 500 and VoLTE network node 510, in conjunction with a UE 110. The exemplary process of FIG. 8 occurs subsequent to execution of the Next Generation network/VoLTE network attach process of FIG. 4, such that UE 110 is already attached to Next Generation Mobile network 120 and to VoLTE network 130. The exemplary process of FIG. 8 is described below with reference to the example network environment diagrams of FIGS. 9A and 9B.

Figure 9A:
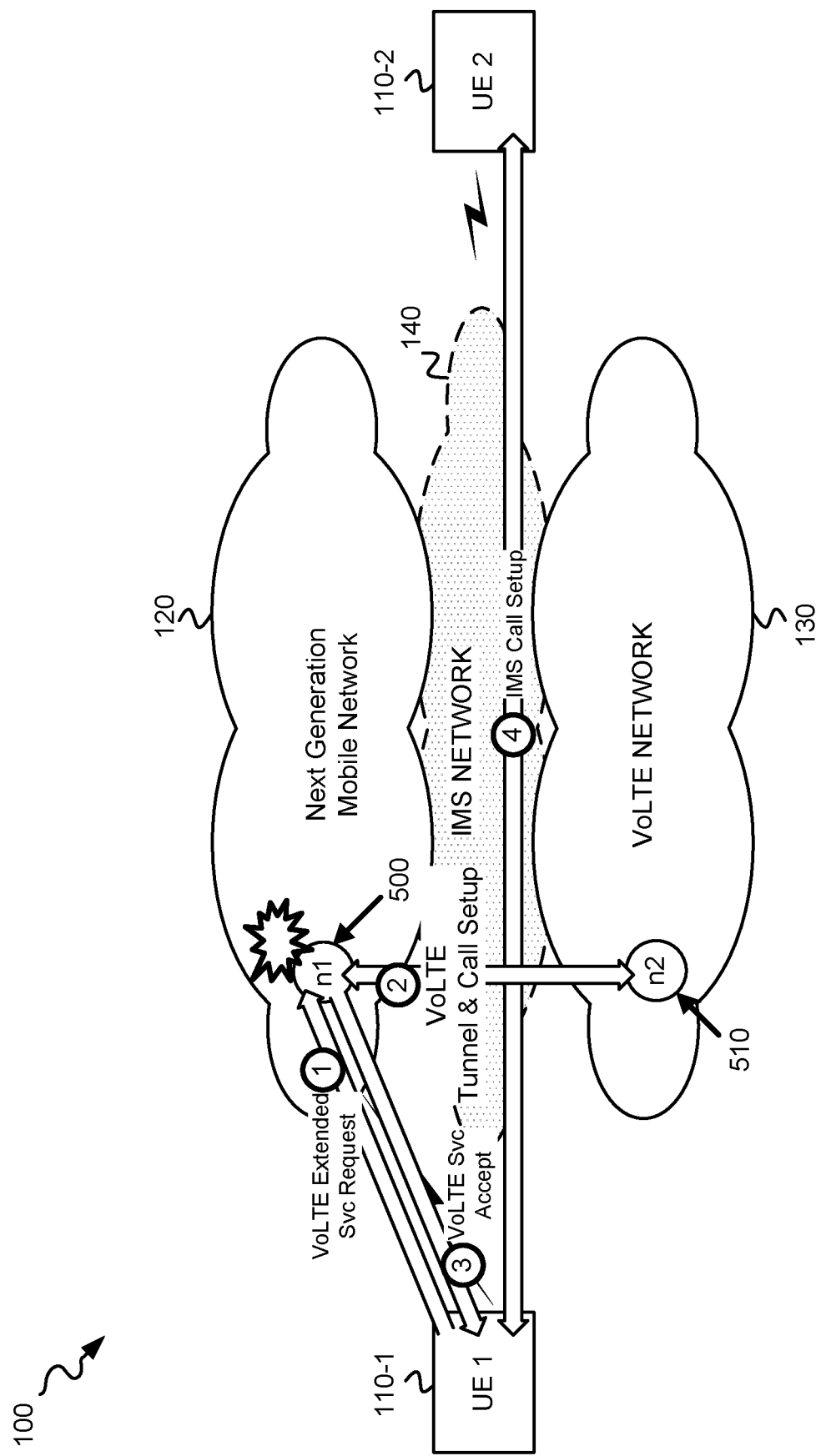
FIGS. 9A and 9B are example network environment diagrams that illustrate the exemplary process of FIG. 8.

The exemplary process may include Next Generation network node 500 receiving a VoLTE Extended Service Request from a UE 110 (block 800). FIG. 9A depicts UE 110-1 sending a VoLTE Extended Service request (identified with a sequence number "1" within a circle) to Next Generation network node n1 500 requesting a VoLTE voice call via VoLTE network 130. Upon receipt of the VoLTE Extended Service Request from UE 110, Next Generation network node 500 engages in VoLTE tunnel setup and VoLTE voice call setup with VoLTE network node 510 (block 810). FIG. 9A depicts Next Generation network node n1 500 engaging in VoLTE tunnel setup and call setup (identified with a sequence number "2" within a circle) with VoLTE network node n2 510. Upon completion of VoLTE tunnel and VoLTE call setup, Next Generation network node 500 returns a VoLTE service accept message to the UE 110 (block 820). FIG. 9A depicts Next Generation network node n1 500 returning a VoLTE Service accept message (identified with a sequence number "3" within a circle) to UE 110-1 notifying UE 110-1 that UE 110-1 may now engage in VoLTE voice calls.

Upon receipt of the service accept message from Next Generation Mobile Network 120, the call originating UE 110 engages in VoLTE IMS call setup, via the IMS PDN connection previously established (in block 440 of the exemplary process of FIG. 4), with a call destination device (block 830). Existing SIP signaling processes may be used for the VoLTE IMS call setup between the call originating UE 110 and the call destination device (e.g., between UE 110-1 and UE 110-2). Though not depicted in FIG. 9A, the SIP signaling for the VoLTE IMS call setup may be tunneled through Next Generation Mobile network 120 to VoLTE network 130. The VoLTE IMS call setup signaling enables a voice call to be placed between UE 110 and the call destination device. FIG. 9A depicts UE 110-1 engaging in IMS call setup (identified with a sequence number "4" within a circle) with call destination device UE 110-2.

Figure 9B:
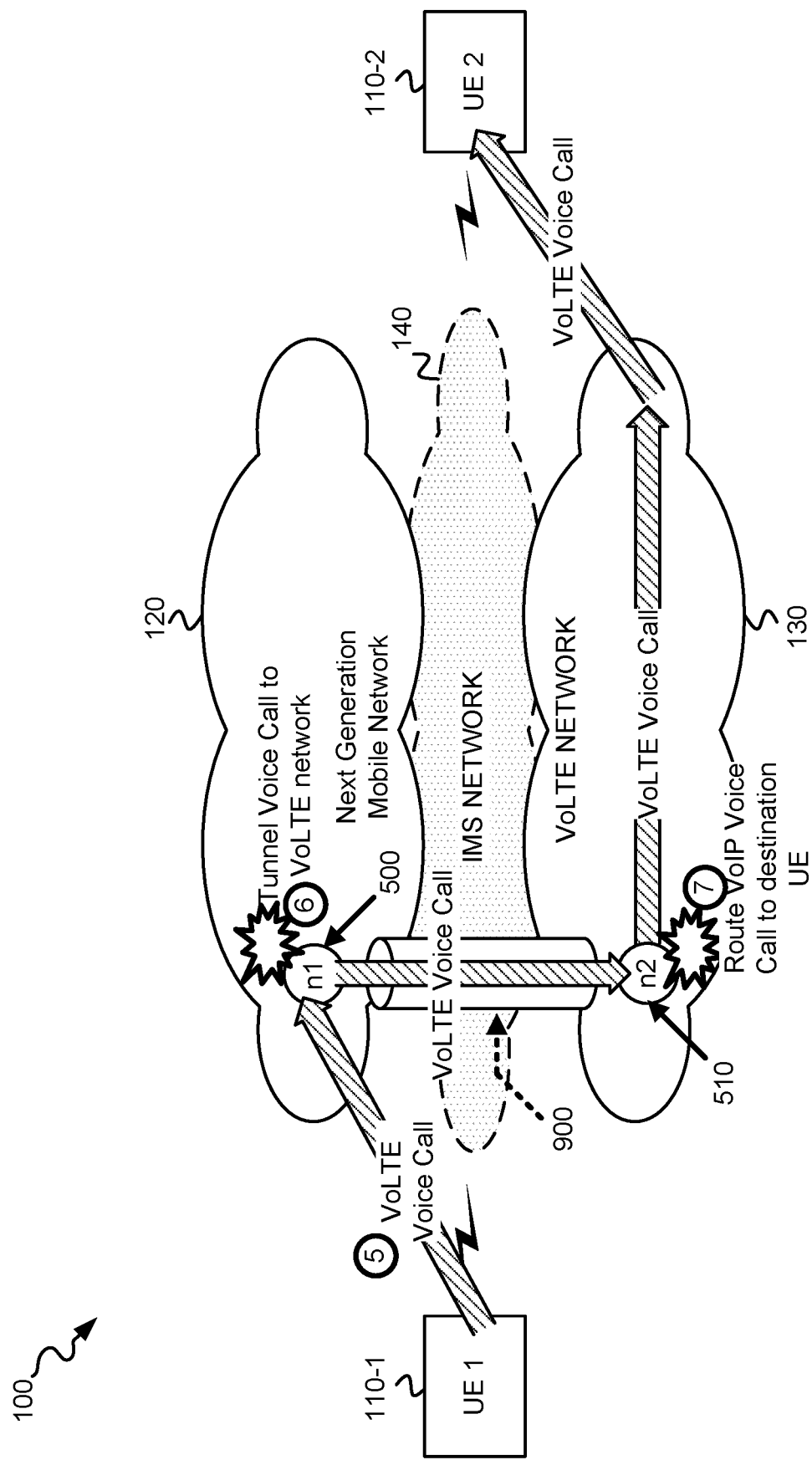

UE 110 sends a VoLTE voice call to Next Generation Mobile network 120 (block 840), and Next Generation network node 500 tunnels the VoLTE voice call to VoLTE network node 510 (block 850). FIG. 9B depicts UE 110-1 sending a VoLTE voice call (identified with a "5" within a circle) to Next Generation Mobile network 120 and, upon receipt, Next Generation network node n1 500 tunnels (identified with a "6" within a circle) the VoLTE voice call, via a tunnel 900, to VoLTE network node n2 510. Upon receipt of the tunneled VoLTE voice call, VoLTE network node 510 routes the tunneled voice call towards the destination device of the call (block 860). FIG. 9B depicts VoLTE network node 510 routing (identified with a sequence number "7" within a circle) the received VoLTE voice call towards the destination UE 110-2 in VoLTE network 130. Subsequent to VoLTE voice call setup, a bidirectional flow of voice packets (only one direction of flow is show in FIG. 9B) for the voice call and control signaling may occur between UE 110-1 and the call destination device UE 110-2.

Figure 10A:
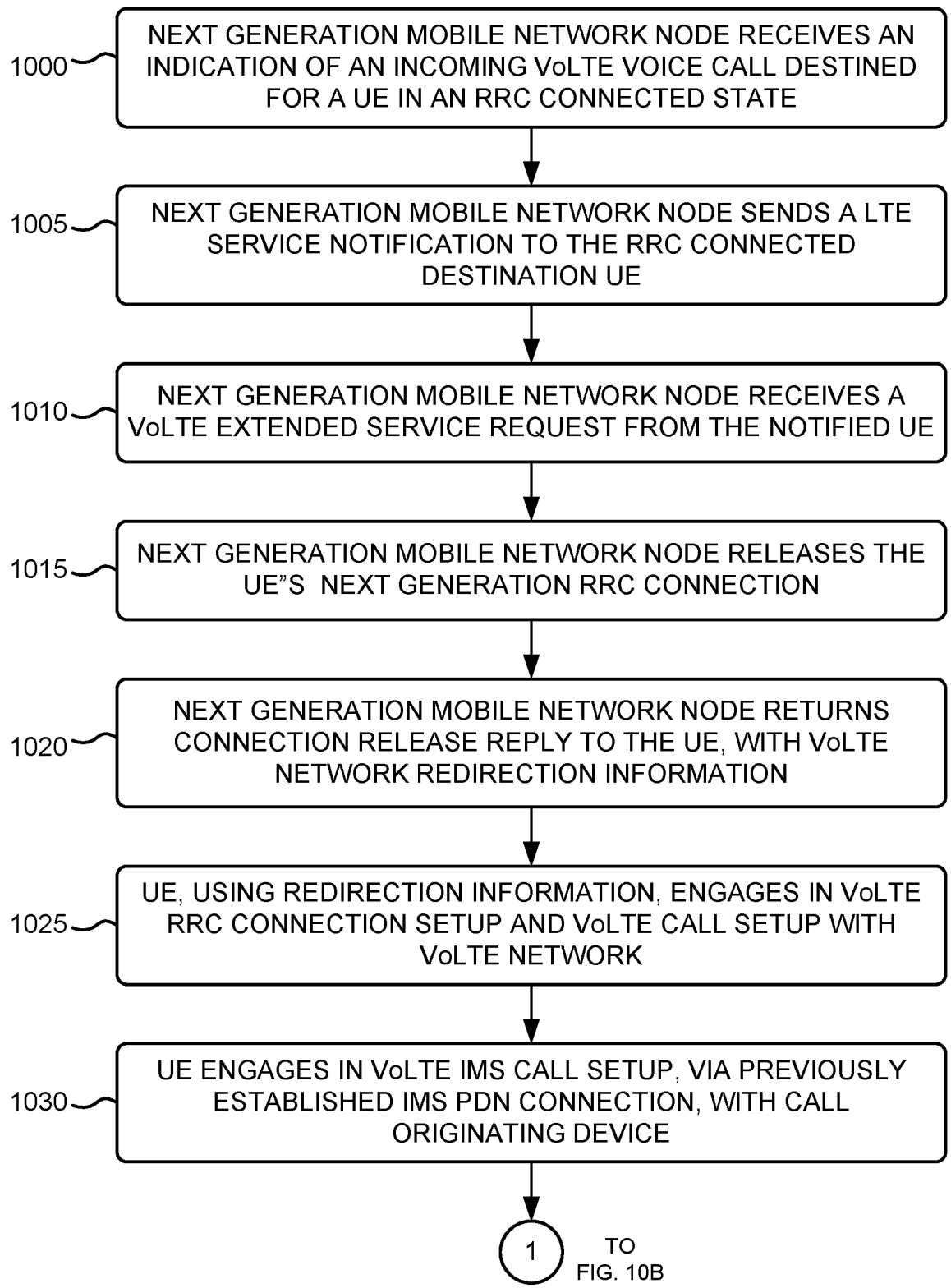
FIGS. 10A and 10B are flow diagrams of an exemplary process for establishing and terminating a VoLTE voice call that originates with another user equipment, where the call destination user equipment is in an "RRC connected" state with the Next Generation Mobile network.
Figure 10B:
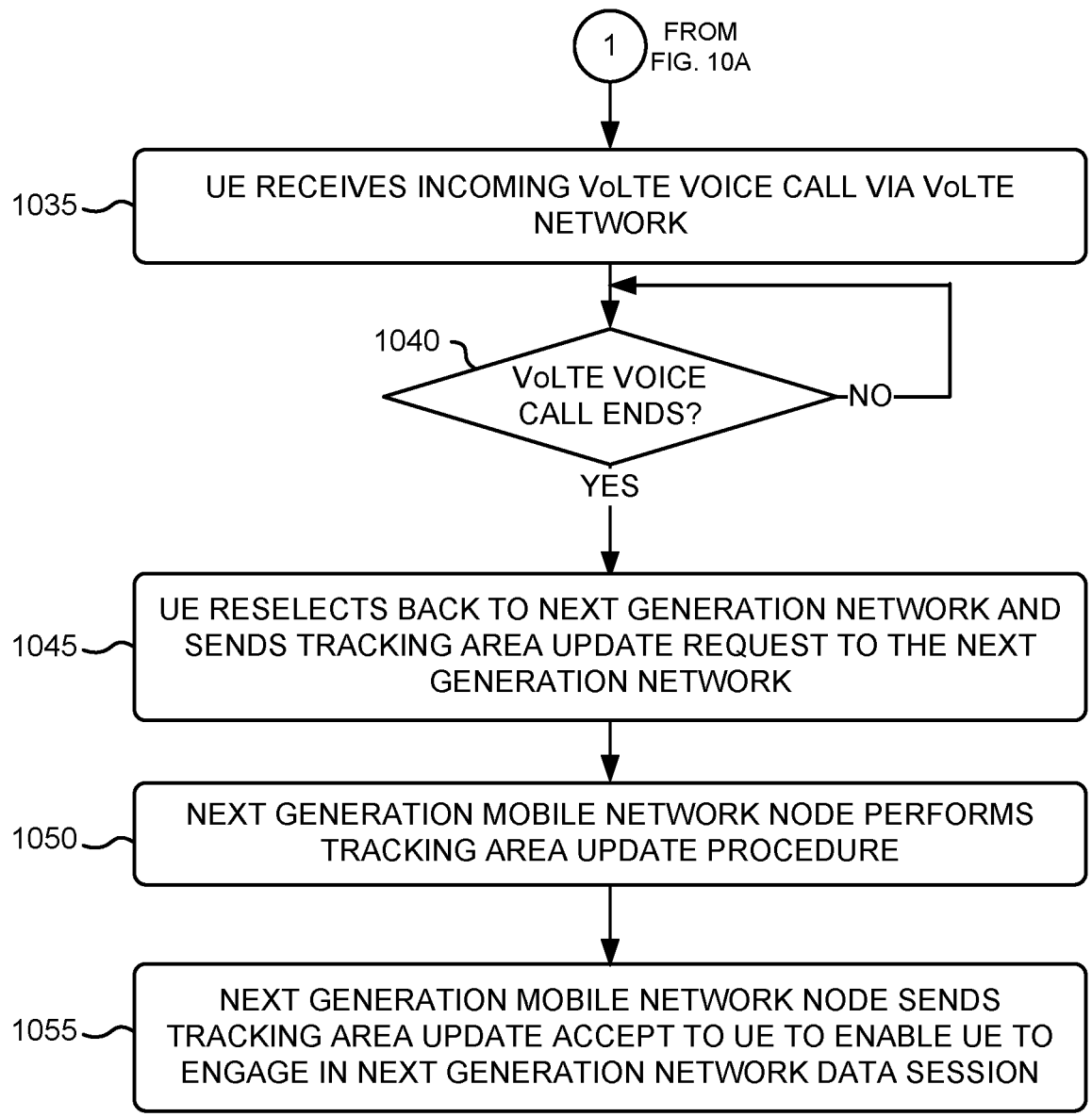

FIGS. 10A and 10B are flow diagrams of an exemplary process for establishing and terminating a VoLTE voice call that originates with another UE 110-2 connected to Next Generation Mobile Network 120 in circumstances where the call destination UE 110-1 is in an "RRC connected" state with Next Generation Mobile Network 120. When in an "RRC connected" state, a UE 110 has an active RF connection with network 120 and is known to the particular gNB or eNB currently serving the UE 110. The exemplary process of FIGS. 10A and 10B may be implemented by Next Generation Mobile network node 500 and VoLTE network node 510, in conjunction with a UE 110. The exemplary process of FIGS. 10A and 10B occurs subsequent to execution of the Next Generation network/VoLTE network attach process of FIG. 4, such that the UE 110 that is the destination of the VoLTE voice call is already attached to Next Generation Mobile network 120 and to VoLTE network 130. The exemplary process of FIGS. 10A and 10B is described below with reference to the example network environment diagrams of FIGS. 11A-11E.

Figure 11A:
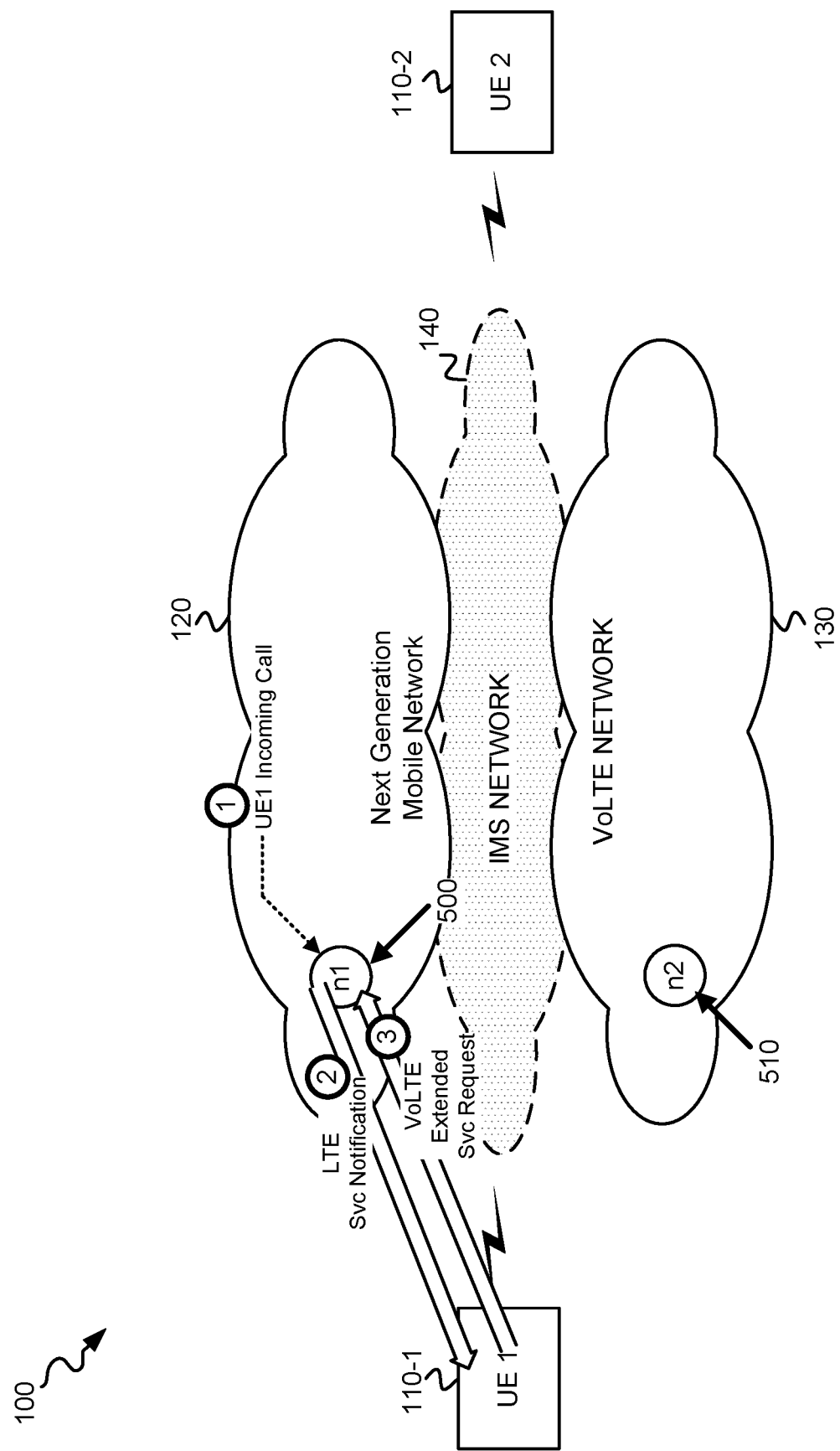
FIGS. 11A-11E are example network environment diagrams that illustrate the exemplary process of FIGS. 9A and 9B.

The exemplary process may include Next Generation network node 500 receiving an indication of an incoming VoLTE voice call destined for a UE 110 (block 1000). Next Generation network node n1 500 may receive a message (identified with a sequence number "1" within a circle in FIG. 11A) from VoLTE network node n2 510, or another node in VoLTE network 130 (not shown), indicating that a source UE (e.g., UE 110-2 in FIG. 11A) has sent an incoming VoLTE voice call to a destination UE (e.g., UE 110-1 in FIG. 11A). Selection of Next Generation network node 500, and/or routing of the indication of the incoming call to the destination UE 110, may be based on registration information or location information of the destination UE 110 within VoLTE network 130. Upon receipt of the indication of the incoming VoLTE voice call, the Next Generation network node 500 sends a LTE service notification message to the RRC connected destination UE 110 (block 1005). FIG. 11A depicts Next Generation network node 500 sending a LTE Service Notification (identified with a sequence number "2" within a circle) to the call destination UE 110-1. The LTE Service Notification may indicate that there is an incoming VoLTE call destined for UE 110-1. Next Generation mobile network node 500 receives a VoLTE Extended Service Request from the notified UE 110 (block 1010). Upon receipt of the LTE Service notification, the destination UE 110-1 sends a VoLTE Extended Service Request (identified with a sequence number "3" within a circle) to Next Generation network node 500 requesting VoLTE voice call service.

Figure 11B:
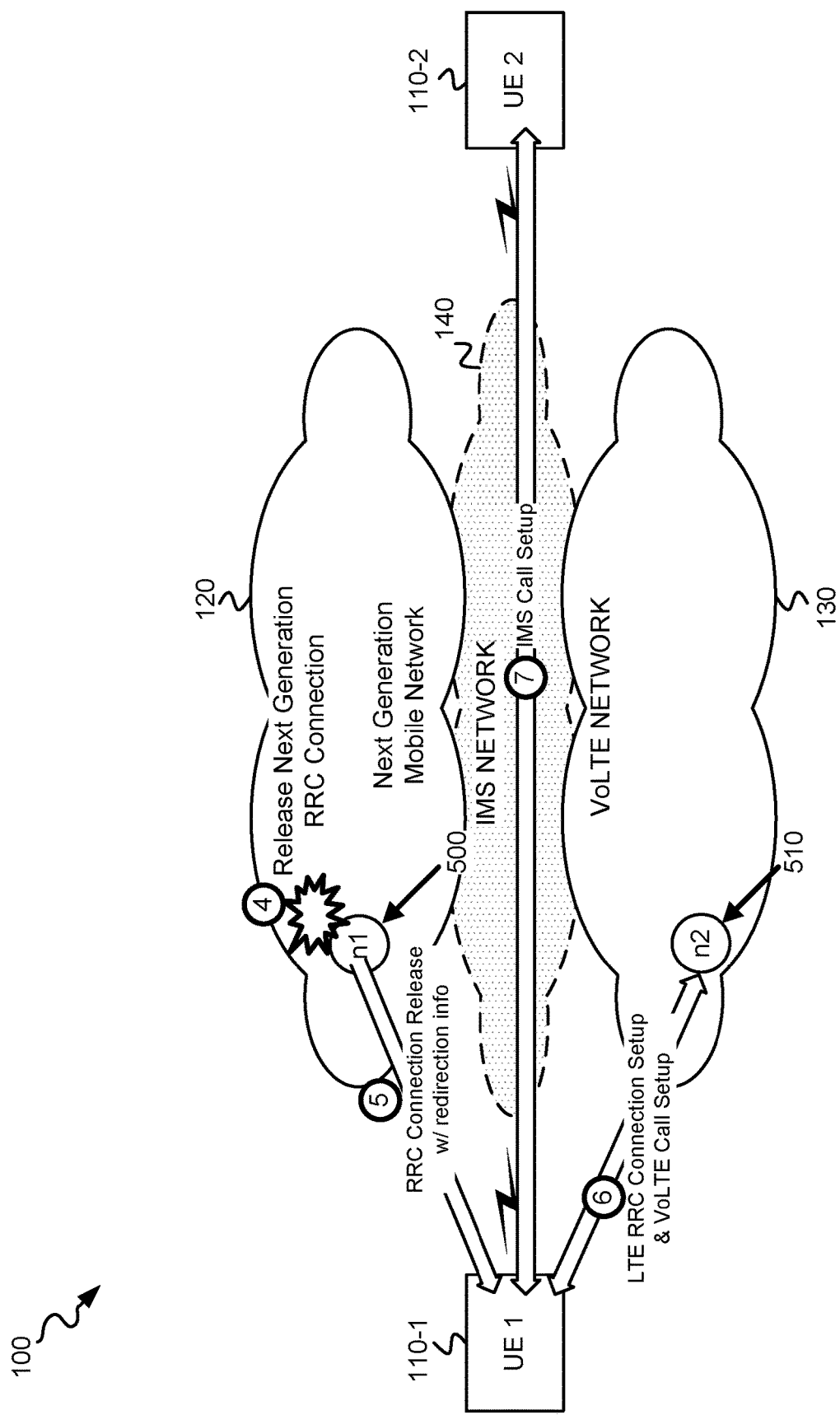

Next Generation network node 500 releases the call destination UE 110's Next Generation network Radio Resource Control (RRC) connection (block 1015), and returns a connection release reply to the call destination UE 110, with VoLTE redirection information (block 1020). FIG. 11B depicts Next Generation network node 500, based on receipt of the VoLTE Extended Service Request message from the call destination UE 110-1, releasing the Next Generation RRC connection (identified with a sequence number of "4" within a circle), and sending a RRC connection release message (identified with a sequence number of "5" within a circle) containing VoLTE redirection information to the call destination UE 110-1.

The call destination UE 110, using the received redirection information, engages in VoLTE RRC connection setup and VoLTE call setup with VoLTE network 130 (block 1025). FIG. 11B depicts UE 110-1 engaging in LTE RRC connection setup and VoLTE call setup (identified with a sequence number of "6" within a circle) with a VoLTE network node n2 510. In an alternative implementation, the release of the Next Generation RRC connection may be omitted, and the RRC connection release message may be replaced with an alternative message that only includes redirection information for connecting to VoLTE network 130. In this alternative implementation, the call destination UE 110-1 may continue with one or more data sessions via Next Generation Mobile network 120, but also engage in VoLTE voice calls via VoLTE network 130.

The call destination UE 110 engages in VoLTE IMS call setup, via the previously established IMS PDN connection (established in block 440 of the exemplary process of FIG. 4), with the call originating device (block 1030). Existing SIP signaling processes may be used for the VoLTE IMS call setup between the call destination UE 110 and the call originating device (e.g., between UE 110-1 and UE 110-2). The VoLTE IMS call setup signaling enables a voice call to be placed between the call originating UE 110-2 and the call destination UE 110-1. FIG. 11B depicts UE 110-1 engaging in IMS call setup (identified with a sequence number "7" within a circle) with call originating device UE 110-2.

Figure 11C:
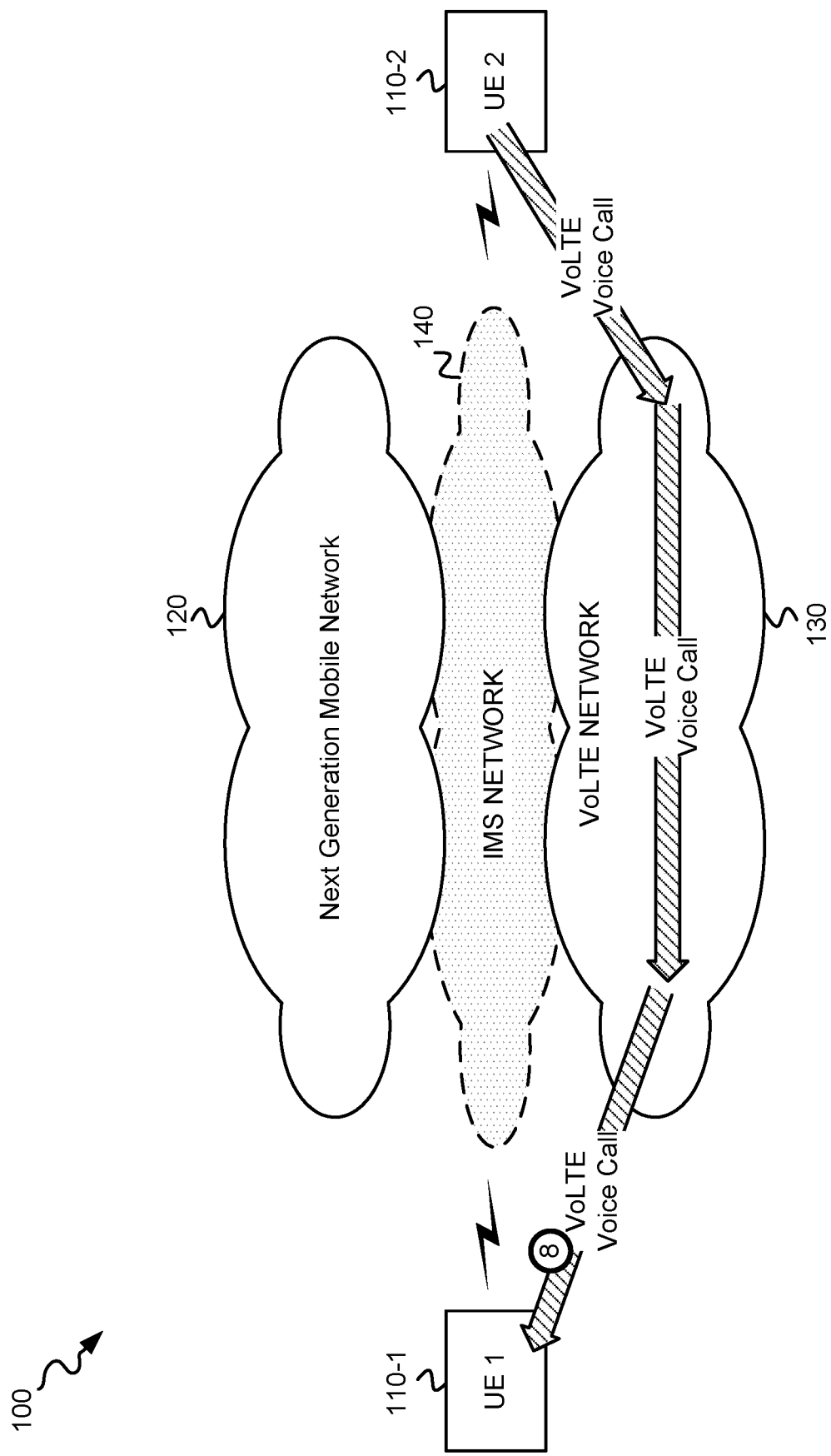

The call destination UE 110 receives the incoming VoLTE voice call via VoLTE network 130 (block 1035). FIG. 11C depicts a VoLTE voice call (identified with a sequence number of "8" within a circle), that originated from UE 110-2, being transported via VoLTE network 130 and then received at call destination UE 110-1 subsequent to the LTE RRC connection setup and VoLTE call setup of block 1025. Though not shown in FIG. 11C, subsequent to VoLTE voice call setup, a bidirectional flow of voice packets (only one direction of flow is show in FIG. 11C) for the voice call and control signaling may occur between UE 110-2 and the call destination device UE 110-1.

Figure 11D:
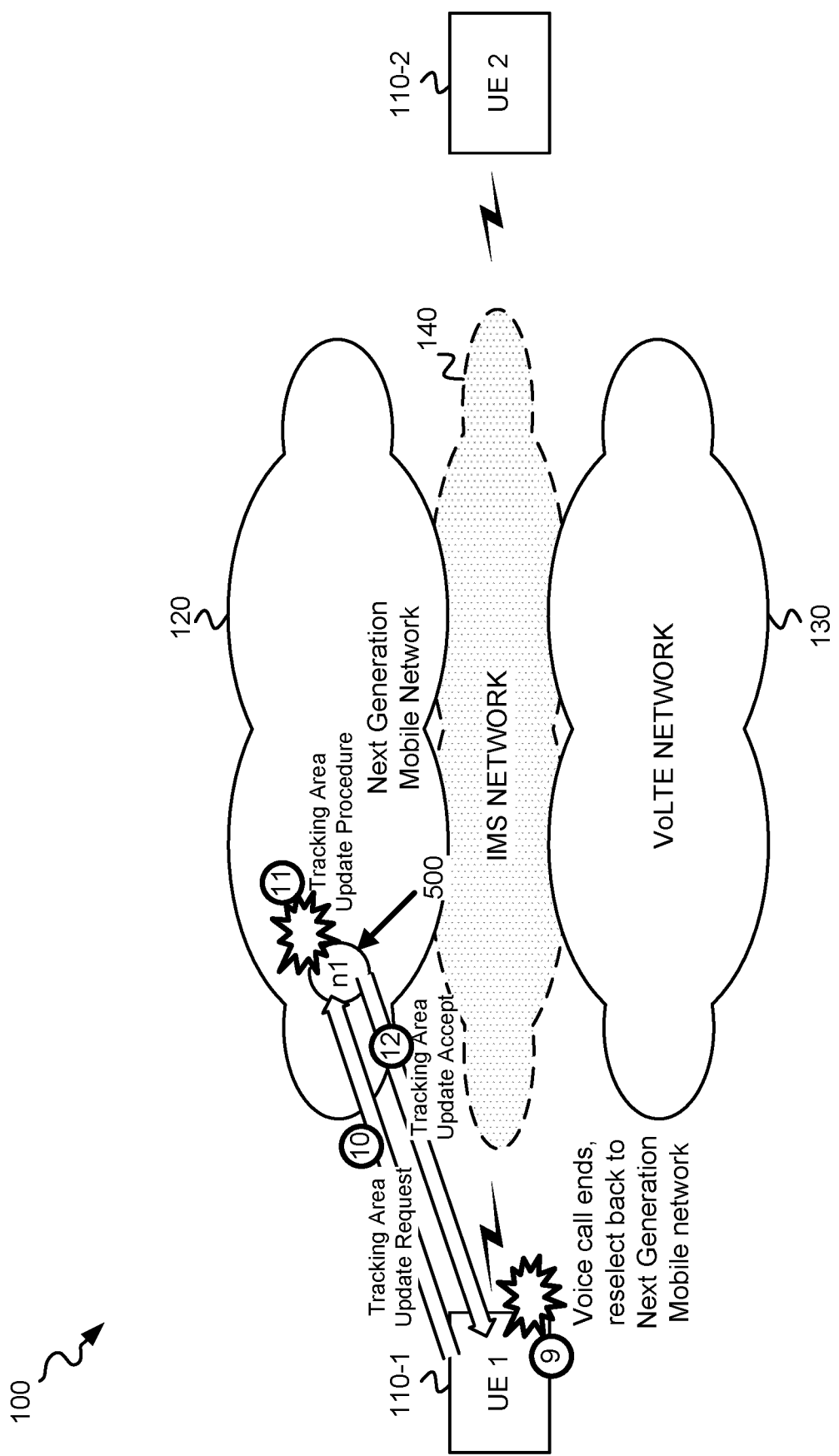

Once the VoLTE voice call ends (YES—block 1040), then the call destination UE 110 reselects back to Next Generation Mobile network 120, and sends a Tracking Area Update (TAU) request to Next Generation Mobile network 120 (block 1045). FIG. 11D depicts the voice call ending, and UE 110-1 reselecting (identified with a "9" within a circle) back to the Next Generation Mobile network 120. FIG. 11D further shows UE 110-1 sending a TAU request (identified with a "10" within a circle) to Next Generation network node n1 500. In the alternative implementation in which the Next Generation RRC was never released, the TAU request, and update procedure, may be omitted from the exemplary process of FIGS. 10A and 10B (e.g., omission of the tracking area update request of block 1045, the tracking area update procedure of block 1050, and the tracking area update accept of block 1055).

Figure 11E:
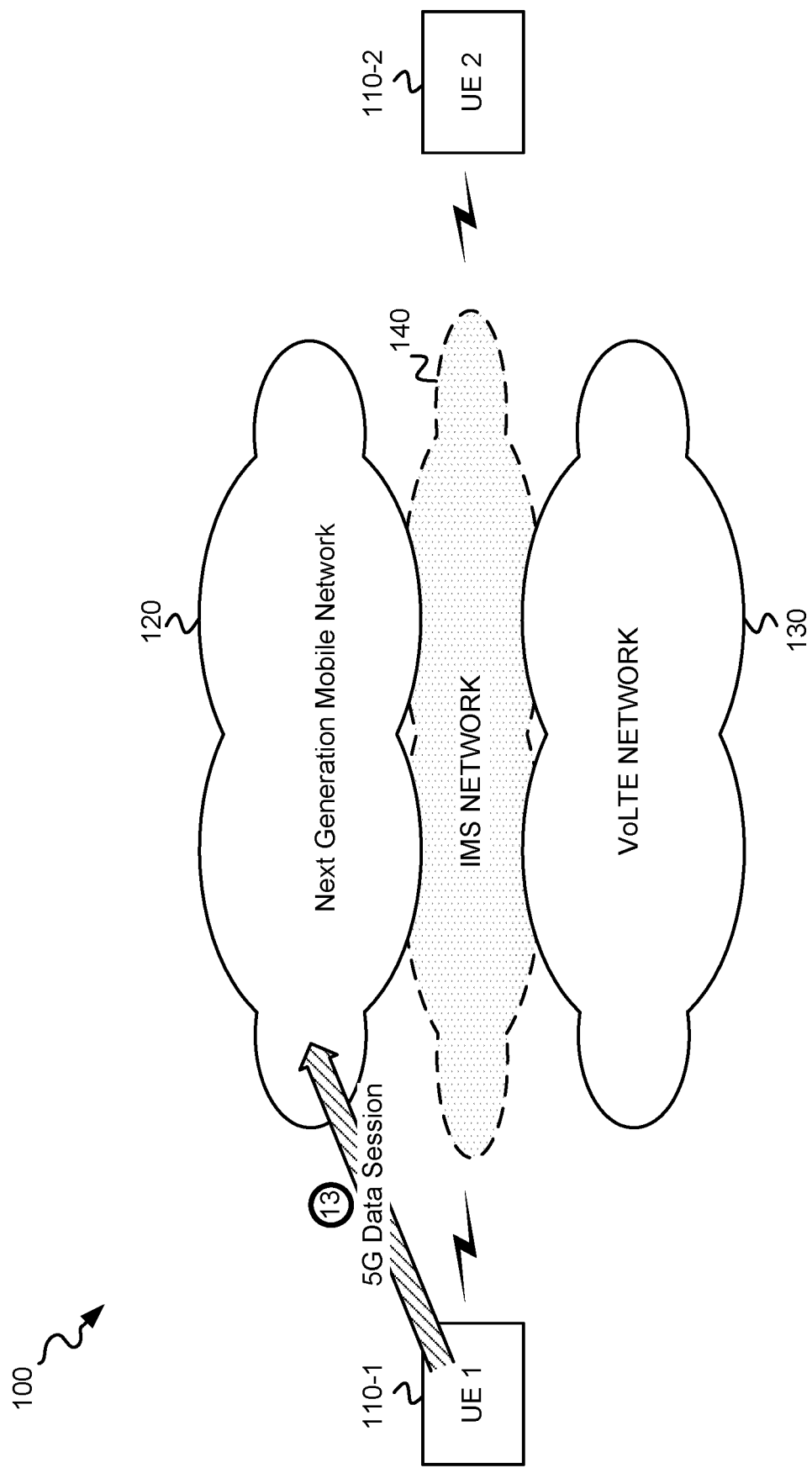

Next Generation Mobile network node 500 performs the Tracking Area Update procedure (block 1050), and sends a TAU accept message to UE 110-1 to enable UE 110-1 to engage in a data session with Next Generation Mobile network 120 (block 1055). FIG. 11D depicts Next Generation network node n1 500 performing the TAU procedure (identified with a "11" within a circle) and returning a TAU accept message (identified with a "12" within a circle) to UE 110-1 upon completion of the TAU procedure. FIG. 11E further shows UE 110-1, subsequent to receiving the TAU accept message, engaging in a data session (identified with a "13" within a circle) with Next Generation Mobile network 120.

Figure 12A:
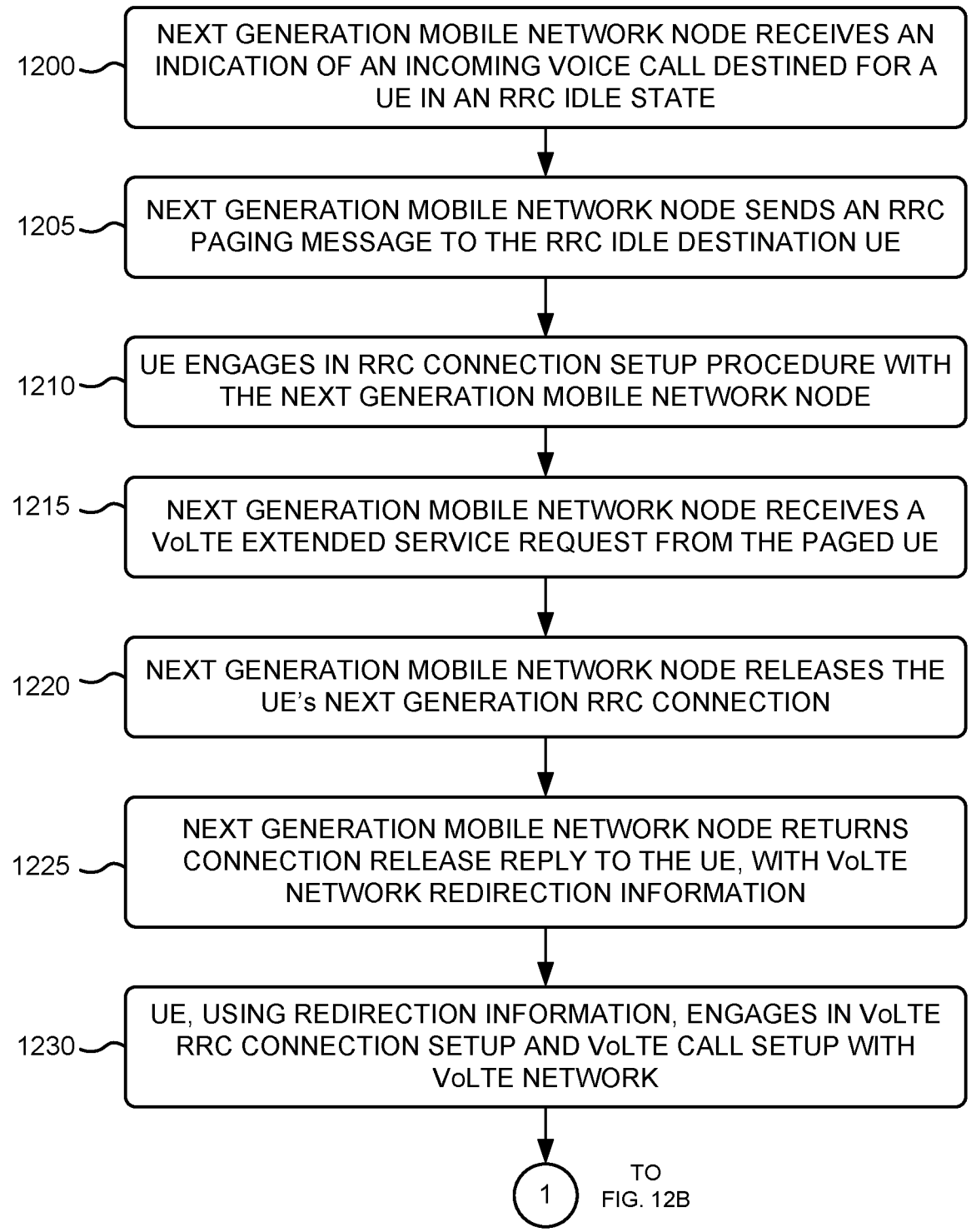
FIGS. 12A and 12B are flow diagrams of an exemplary process for establishing and terminating a VoLTE voice call that originates with another user equipment, where the call destination user equipment is in an "RRC idle" state with the Next Generation Mobile Network.
Figure 12B:
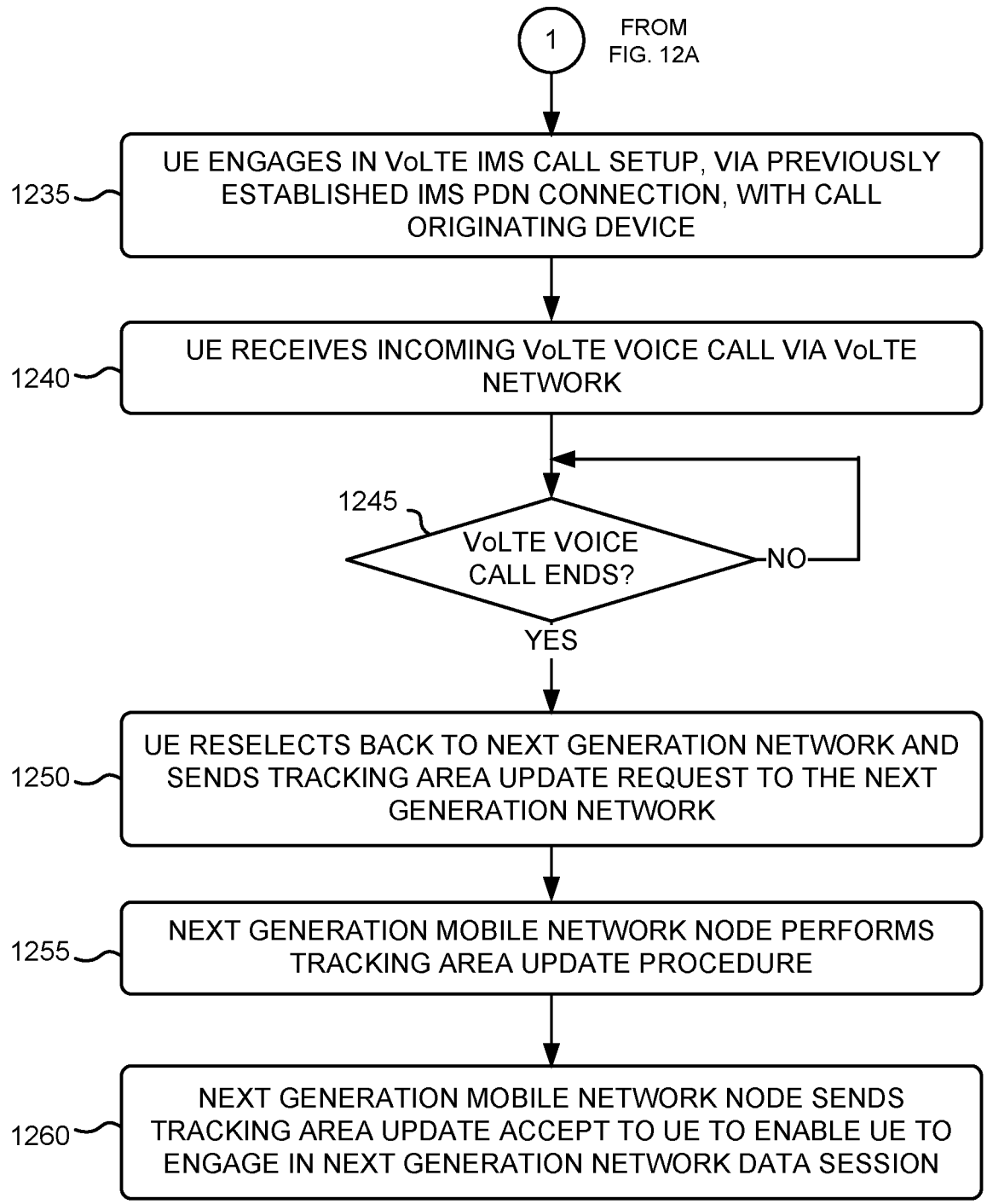

FIGS. 12A and 12B are flow diagrams of an exemplary process for establishing and terminating a VoLTE voice call that originates with another UE 110-2 connected to Next Generation Mobile Network 120 in circumstances where the call destination UE 110-1 is in an "RRC idle" state with Next Generation Mobile Network 120. When in an "RRC idle" state, a UE 110 has an inactive RF connection with network 120 and is not known to the particular gNB or eNB that should be serving the UE 110 based on the UE 110's current location. The exemplary process of FIGS. 12A and 12B may be implemented by Next Generation Mobile network node 500 and VoLTE network node 510, in conjunction with a UE 110. The exemplary process of FIGS. 12A and 12B occurs subsequent to execution of the Next Generation network/VoLTE network attach process of FIG. 4, such that UE 110 is already attached to Next Generation Mobile network 120 and to VoLTE network 130. The exemplary process of FIGS. 12A and 12B is described below with reference to the example network environment diagrams of FIGS. 13A-13E.

The exemplary process may include Next Generation network node 500 receiving an indication of an incoming VoLTE voice call destined for a UE 110-1 (block 1200). Next Generation network node n1 500 may receive a message (identified with a sequence number "1" within a circle in FIG. 13A) from VoLTE network node n2 510, or another node in VoLTE network 130 (not shown), indicating that a source UE (e.g., UE 110-2 in FIG. 13A) has sent an incoming VoLTE voice call to a destination UE (e.g., UE 110-1 in FIG. 13A).

Figure 13A:
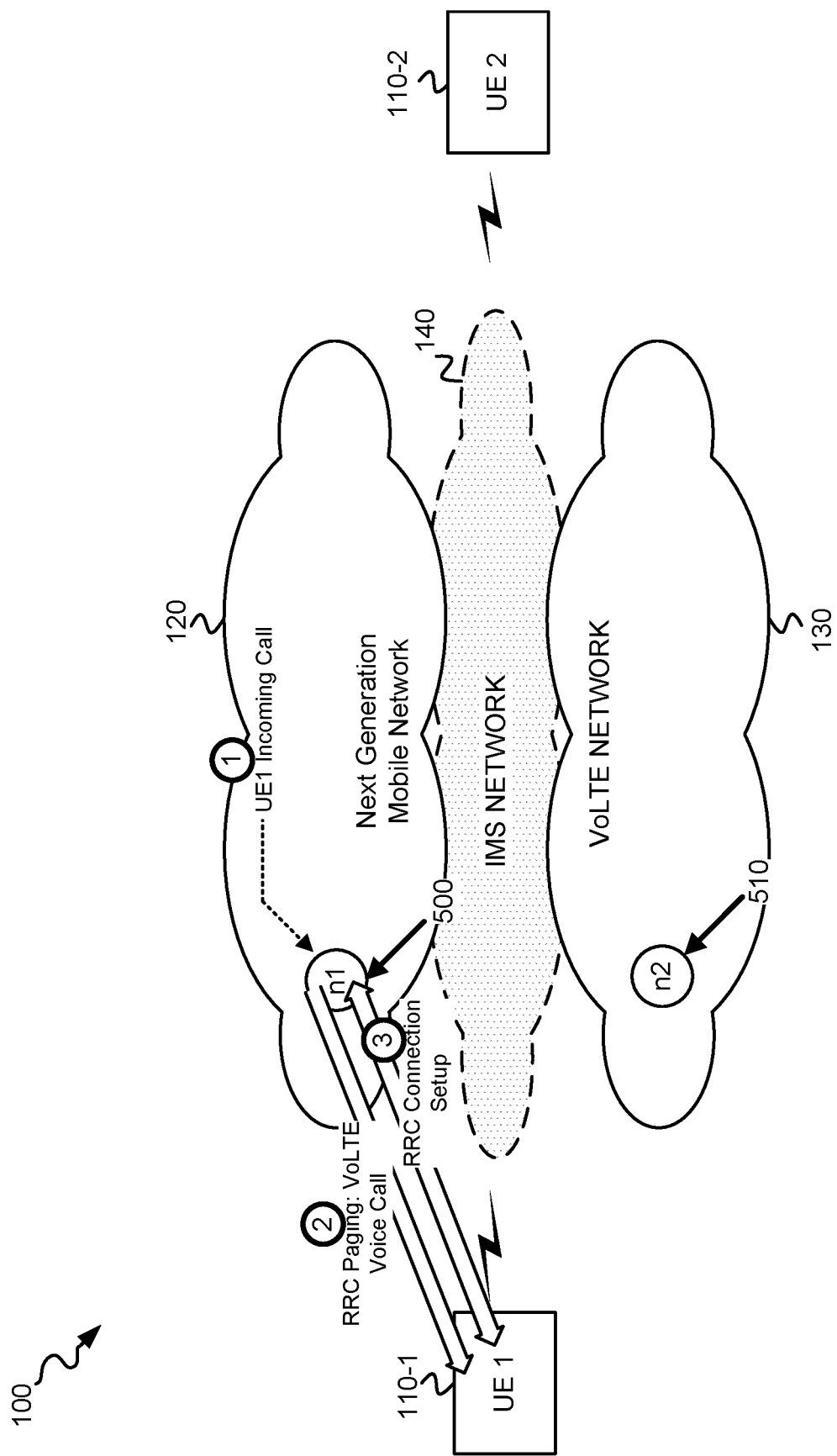
FIGS. 13A-13E are example network environment diagrams that illustrate the exemplary process of FIGS. 12A and 12B.

Upon receipt of the indication of the incoming VoLTE voice call, the Next Generation network node 510 sends an RRC paging message to the destination UE 110 that is currently in an RRC idle state (block 1205). The RRC paging message may include an indicator that indicates that there is an incoming VoLTE call for the destination UE 110. FIG. 13A depicts Next Generation network node 500 sending a RRC paging message (identified with a sequence number "2" within a circle) to destination UE 110-1 notifying UE 110-1 of an incoming VoLTE voice call.

The destination UE 110, upon receipt of the RRC paging message, engages in an RRC connection setup procedure with Next Generation Mobile network node 500 (block 1210). FIG. 13A depicts UE 110-1 receiving the RRC paging message, and then engaging in a RRC connection setup procedure (identified with a sequence number "3" within a circle) with Next Generation network node n1 500. The RRC connection setup procedure may include existing RRC connection setup signaling. Next Generation mobile network node 500 receives a VoLTE Extended Service Request from the paged destination UE (block 1215). Subsequent to RRC connection setup, the destination UE 110-1 sends a VoLTE Extended Service Request (identified with a sequence number "4" within a circle) to Next Generation network node 500 requesting VoLTE voice call service.

Figure 13B:
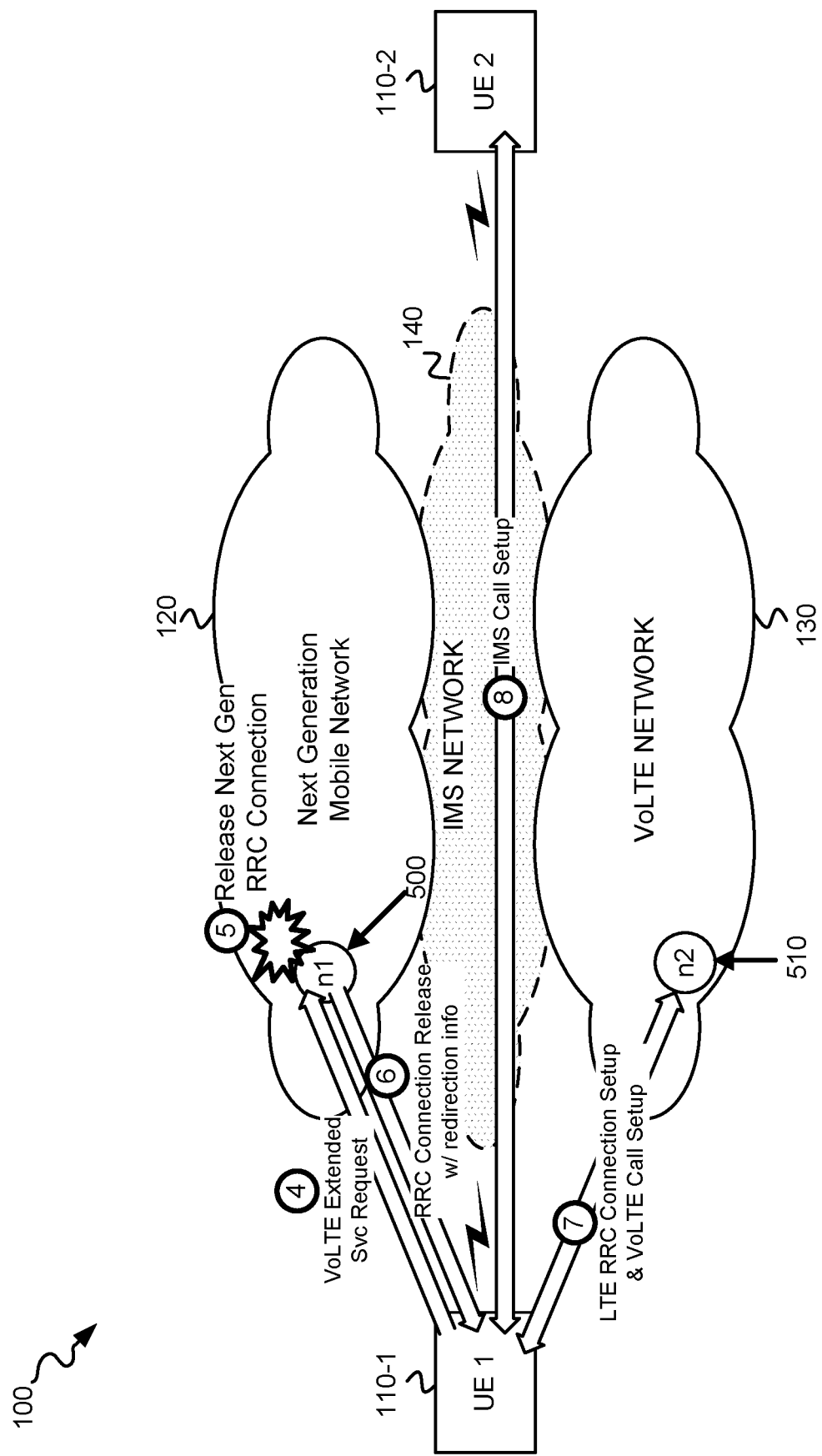

Subsequent to receipt of the VoLTE Extended Service Request, Next Generation network node 500 releases the paged UE 110's Next Generation network Radio Resource Control (RRC) connection (block 1220), and returns a connection release reply to the paged UE 110, with VoLTE network redirection information (block 1225). FIG. 13B depicts Next Generation network node 500 releasing the Next Generation RRC connection (identified with a sequence number of "5" within a circle), and sending a RRC connection release message (identified with a sequence number of "6" within a circle) containing VoLTE redirection information to the destination UE 110-1.

The VoLTE voice call destination UE 110, using the received redirection information, engages in VoLTE RRC connection setup and VoLTE call setup with VoLTE network 130 (block 1230). FIG. 13B depicts UE 110-1 engaging in LTE RRC connection setup and VoLTE call setup (identified with a sequence number of "7" within a circle) with VoLTE network node n2 510. In an alternative implementation, the release of the Next Generation RRC connection may be omitted, and the RRC connection release message may be replaced with an alternative message that only includes redirection information for connecting to VoLTE network 130. In this alternative implementation, UE 110-1 may continue with one or more data sessions via Next Generation Mobile network 120, but also engage in VoLTE voice calls via VoLTE network 130.

The call destination UE 110 engages in VoLTE IMS call setup, via the previously established IMS PDN connection (established in block 440 of the exemplary process of FIG. 4), with the call originating device (block 1235). Existing SIP signaling processes may be used for the VoLTE IMS call setup between the call destination UE 110 and the call originating device (e.g., between UE 110-1 and UE 110-2). The VoLTE IMS call setup signaling enables a voice call to be placed between the call originating UE 110-2 and the call destination UE 110-1. FIG. 13B depicts UE 110-1 engaging in IMS call setup (identified with a sequence number "8" within a circle) with call originating device UE 110-2.

Figure 13C:
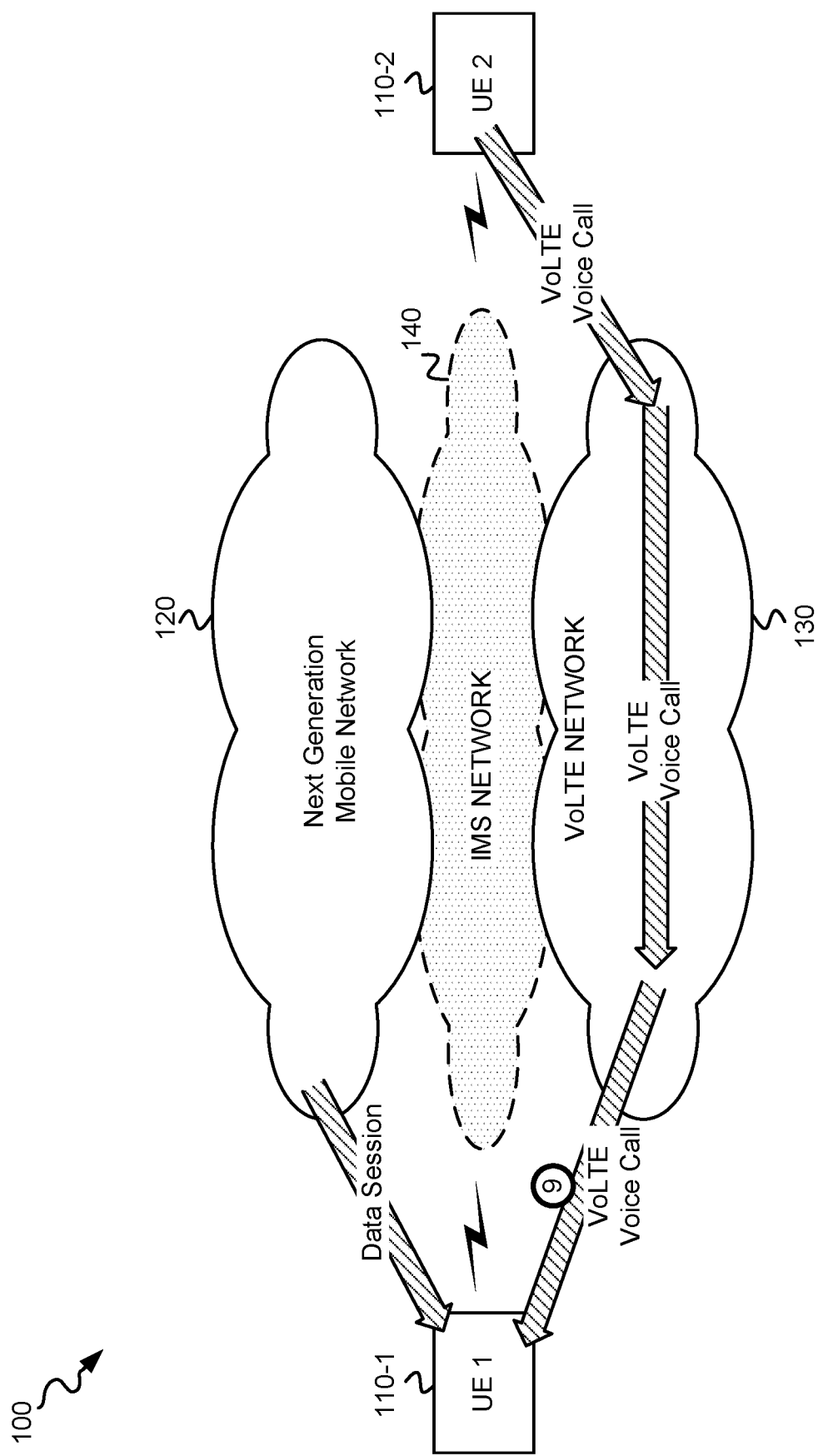

Subsequent to RRC connection setup and VoLTE call setup, and IMS call setup, the destination UE 110 receives the incoming VoLTE voice call via VoLTE network 130 (block 1240)(FIG. 12B). FIG. 13C depicts a VoLTE voice call (identified with a sequence number of "9" within a circle), that originated from UE 110-2, being transported via VoLTE network 130 and then received at call destination UE 110-1 subsequent to the LTE RRC connection setup and VoLTE call setup of block 1230. Though not shown in FIG. 13C, subsequent to VoLTE voice call setup, a bidirectional flow of voice packets (only one direction of flow is show in FIG. 13C) for the voice call and control signaling may occur between UE 110-2 and the call destination device UE 110-1.

Figure 13D:
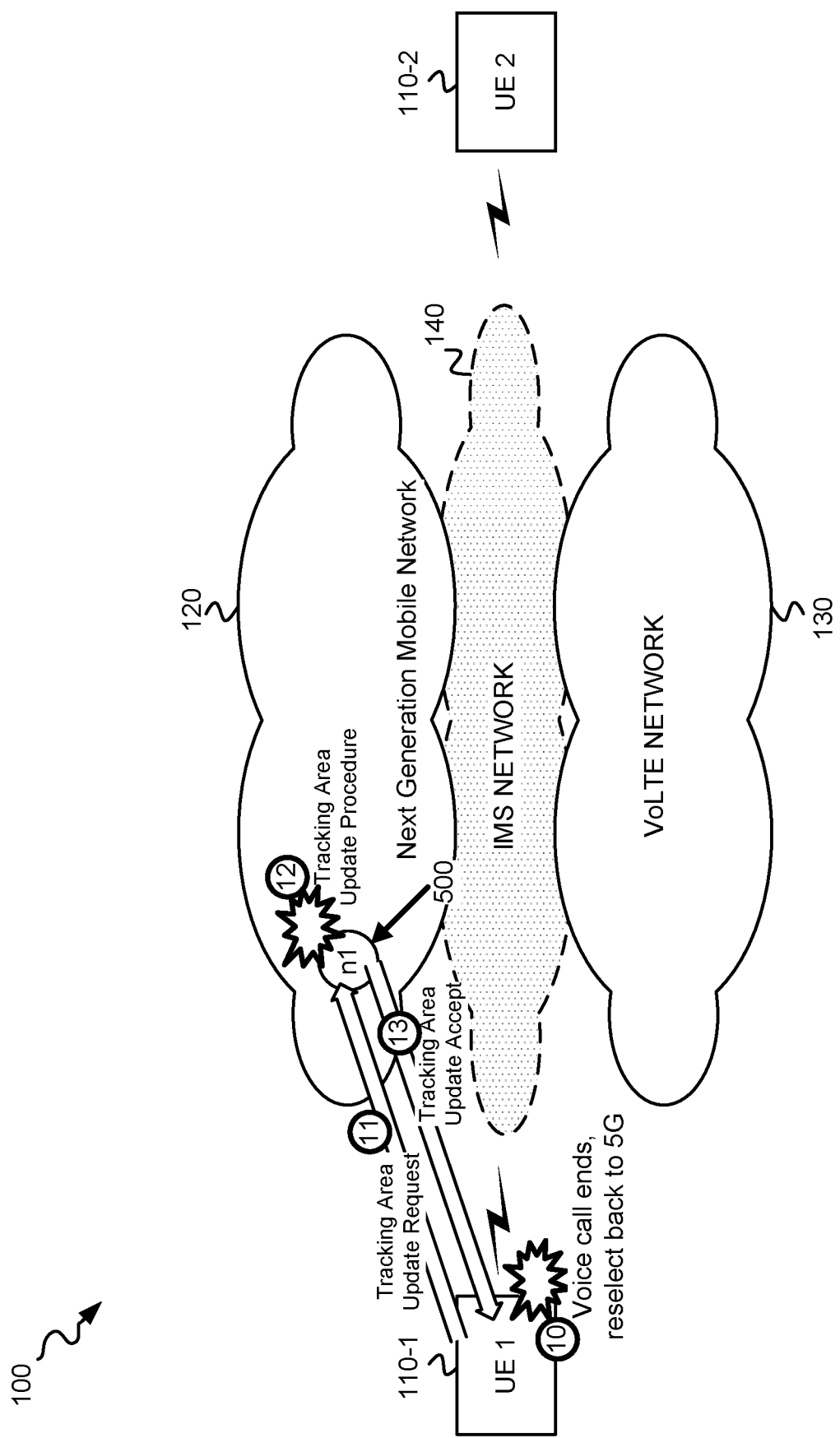

Once the VoLTE voice call ends (YES—block 1245), then the call terminating UE 110 reselects back to Next Generation Mobile network 120, and sends a Tracking Area Update (TAU) request to Next Generation Mobile network 120 (block 1250). FIG. 13D depicts the voice call ending, and UE 110-1 reselecting (identified with a "10" within a circle) back to the Next Generation Mobile network 120. In some implementations, the LTE RRC connection may be released/terminated subsequent to the VoLTE voice call ending. FIG. 13D further shows UE 110-1 sending a TAU request (identified with a "11" within a circle) to Next Generation network node n1 500. In the alternative implementation in which the Next Generation RRC was never released (i.e., UE 110-1 continued to engage in a data session(s) with Next Generation Mobile network 120 during the VoLTE voice call), the TAU request, and update procedure, may be omitted from the exemplary process of FIGS. 12A and 12B (e.g., omission of the tracking area update request of block 1250, the tracking area update procedure of block 1255, and the tracking area update accept of block 1260).

Figure 13E:
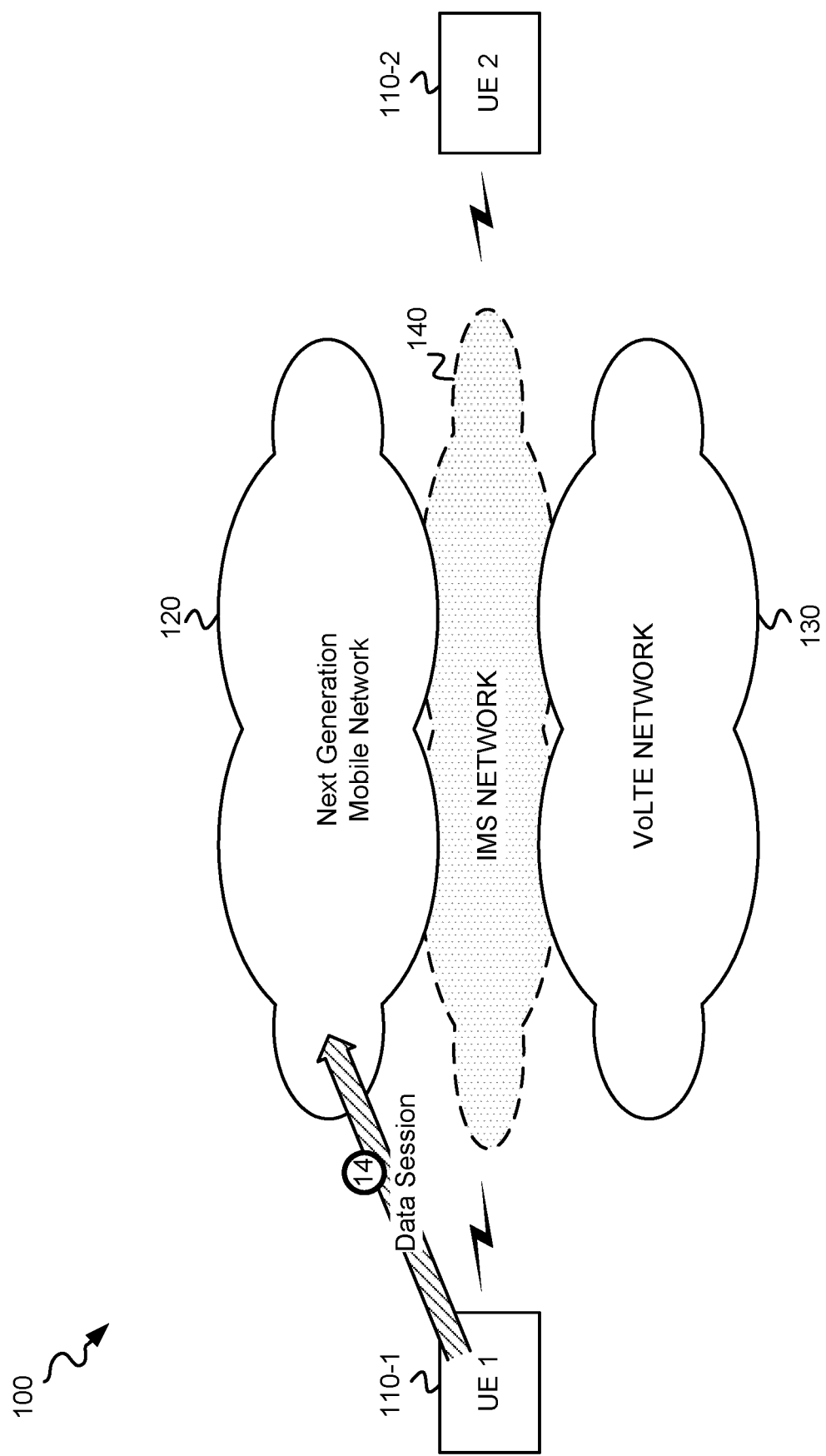

Next Generation Mobile network node 500 performs the Tracking Area Update procedure (block 1255), and sends a TAU accept message to the UE 110 to enable the UE 110 to engage in a data session with Next Generation Mobile network 120 (block 1260). FIG. 13D depicts Next Generation network node n1 500 performing the TAU procedure (identified with a "12" within a circle) and returning a TAU accept message (identified with a "13" within a circle) to UE 110-1 upon completion of the TAU procedure. FIG. 13E further shows UE 110-1, subsequent to receiving the TAU accept message, engaging in a data session (identified with a "14" within a circle) with Next Generation Mobile network 120.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4, 6A, 6B, 8, 10A, 10B, 12A, and 12B, and operation/message flows with respect to FIGS. 5, 7A-7D, 9A, 9B, 11A-11E, and 13A-13E, the order of the blocks and/or operation/message flows may be varied in other implementations.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   initiating attachment procedures, by the first network device in response to receipt of a Fifth Generation (5G) New Radio (NR) network attach request that includes a Voice over Long Term Evolution (VoLTE) network attach request, to attach a user equipment (UE) to a 5G NR network and to a VoLTE network;
   establishing, responsive to the attachment procedures, a connection between the 5G NR network and the UE;
   releasing, responsive to receipt of a first VoLTE service request from the UE, the connection between the 5G NR network and the UE;
   redirecting, responsive to the releasing, the UE to conduct connection setup with the VoLTE network;
   receiving, from the UE after completion of a VoLTE voice call, a tracking area update (TAU) request;
   performing, responsive to the TAU request, a TAU procedure; and
   returning, to the UE, a TAU accept message to enable the UE to engage in a session via the 5G NR network.

2. The method of claim 1, wherein the first network device comprises an access and mobility management function (AMF).

3. The method of claim 1, wherein performing the TAU procedure comprises updating a tracking area in which the UE is located.

4. The method of claim 1, further comprising:
   setting up, by the first network device in response to the first VoLTE service request, a VoLTE tunnel with a second network device in the VoLTE network for tunneling a call session involving the UE from the 5G NR network to the VoLTE network.

5. The method of claim 1, wherein initiating the attachment procedures comprises:
   signaling, by the first network device in response to receiving the VoLTE network attach request, a second network device in the VoLTE network to attach the UE in the VoLTE network.

6. The method of claim 5, wherein initiating the attachment procedures further comprises:
   performing, by the first network device in response to receiving the 5G NR network attach request, signaling to enable the UE to connect to the 5G NR network;
   receiving, by the first network device in the 5G NR network from the second network device in the VoLTE network, a VoLTE attach accept message; and
   returning an attach accept message to the UE indicating successful attachment of the UE to both the 5G NR network and the VoLTE network.

7. The method of claim 1, wherein the UE is in a radio resource control (RRC) connected state, and further comprising:
   receiving an indication of an incoming VoLTE voice call destined for the UE in the RRC connected state;
   sending, responsive to the indication, a service notification to the UE, wherein the service notification indicates the incoming VoLTE voice call;
   receiving, responsive to the UE receiving the service notification, a second VoLTE service request; and
   returning, to the UE, redirection information related to connecting to the VoLTE network to enable the UE to engage in connection setup and call setup via the VoLTE network for receiving the incoming VoLTE voice call.

8. The method of claim 1, wherein the UE is in a radio resource control (RRC) idle state, and further comprising:
   receiving an indication of an incoming VoLTE voice call destined for the UE in the RRC idle state;
   sending, responsive to the indication, a paging message to the UE in the RRC idle state, wherein the paging message indicates the incoming VoLTE voice call;
   receiving, responsive to the UE receiving the paging message, a second VoLTE service request; and
   returning, to the UE, redirection information related to connecting to the VoLTE network to enable the UE to engage in connection setup and call setup via the VoLTE network for receiving the incoming VoLTE voice call.

9. A first network device, comprising:
   one or more processors configured to:
      initiate attachment procedures, in response to receipt of a Fifth Generation (5G) New Radio (NR) network attach request that includes a Voice over Long Term Evolution (VoLTE) network attach request, to attach a user equipment (UE) to a 5G NR network and to a VoLTE network, wherein the UE is in a radio resource control (RRC) connected state;
      initiate establishment of a connection between the 5G NR network and the UE;
      receive an indication of an incoming VoLTE voice call destined for the UE in the RRC connected state;
      send, to the UE, a service notification that indicates the incoming VoLTE voice call;
      receive, responsive to the UE receiving the service notification, a first VoLTE service request; and
      return, to the UE, redirection information related to connecting to the VoLTE network to enable the UE to engage in a connection setup and a call setup via the VoLTE network for receiving the incoming VoLTE voice call.

10. The first network device of claim 9, wherein the one or more processors are further configured to:
    receive, from the UE subsequent to the attachment procedures, a second VoLTE service request,
    release, in response to the second VoLTE service request, the connection between the 5G NR network and the UE, and
    redirect the UE to conduct the connection setup with the VoLTE network.

11. The first network device of claim 10, wherein the one or more processors are further configured to:
    receive, from the UE subsequent to completion of a VoLTE voice call, a tracking area update (TAU) request,
    perform a TAU procedure, and
    return, to the UE, a TAU accept message to enable the UE to engage in a session via the 5G NR network.

12. The first network device of claim 9, wherein the one or more processors are further configured to:
    receive, from the UE subsequent to the attachment procedures, a second VoLTE service request; and
    set up, in response to the second VoLTE service request, a VoLTE tunnel with a second network device in the VoLTE network for tunneling a call session involving the UE from the 5G NR network to the VoLTE network.

13. The first network device of claim 9, wherein, when initiating the attachment procedures, the one or more processors are further configured to:

signal, in response to receiving the VoLTE network attach request, a second network device in the VoLTE network to attach the UE in the VoLTE network.

14. The first network device of claim 13, wherein, when initiating the attachment procedures, the one or more processors are further configured to:
perform, in response to receiving the 5G NR network attach request, signaling to enable the UE to connect to the 5G NR network;
receive, from the second network device in the VoLTE network, a VoLTE attach accept message; and
return an attach accept message to the UE indicating successful attachment of the UE to both the 5G NR network and the VoLTE network.

15. The first network device of claim 9, wherein the first network device comprises an access and mobility management function (AMF).

16. A non-transitory storage medium storing instructions executable by a first network device, wherein the instructions comprise instructions to cause the first network device to:
initiate attachment procedures, in response to receipt of a Fifth Generation (5G) New Radio (NR) network attach request that includes a Voice over Long Term Evolution (VoLTE) network attach request, to attach a user equipment (UE) to a 5G NR network and to a VoLTE network;
initiate, responsive to the attachment procedures, establishment of a connection between the 5G NR network and the UE;
signal, responsive to the VoLTE network attach request, a second network device in the VoLTE network to attach the UE in the VoLTE network;
receive, from the second network device, a VoLTE attach accept message;
return an attach accept message to the UE indicating successful attachment of the UE to both the 5G NR network and the VoLTE network;
release, in response to a VoLTE service request received from the UE, the connectionj between the 5G NR network and the UE; and
redirect the UE to conduct connection setup with the VoLTE network.

17. The non-transitory storage medium of claim 16, wherein the UE is in a radio resource control (RRC) idle state, and wherein the instructions further cause the first network device to:
receive an indication of an incoming VoLTE voice call destined for the UE in the RRC idle state;
send a paging message to the UE in the RRC idle state, wherein the paging message indicates the incoming VoLTE voice call;
receive, in response to the UE receiving the paging message, the VoLTE service request; and
return, to the UE, redirection information related to connecting to the VoLTE network to enable the UE to engage in connection setup and call setup via the VoLTE network for receiving the incoming VoLTE voice call.

18. The non-transitory storage medium of claim 16, wherein the second network device comprises a mobility management entity (MME).

19. The non-transitory storage medium of claim 16, wherein the instructions further comprise instructions to cause the first network device to:
receive, from the UE based on the attach accept message, the VoLTE service request; and
set up, in response to the VoLTE service request, a VoLTE tunnel with the second network device in the VoLTE network for tunneling a call session involving the UE from the 5G NR network to the VoLTE network.

20. The non-transitory storage medium of claim 16, wherein the first network device comprises an access and mobility management function (AMF).

* * * * *